United States Patent
Fuller et al.

(10) Patent No.: US 8,813,225 B1
(45) Date of Patent: Aug. 19, 2014

(54) PROVIDER-ARBITRATED MANDATORY ACCESS CONTROL POLICIES IN CLOUD COMPUTING ENVIRONMENTS

(75) Inventors: Erik J. Fuller, Cape Town (ZA); Eric J. Brandwine, Haymarket, VA (US); Christopher J. Lefelhocz, Bothell, WA (US); Arijit Ganguly, Kirkland, WA (US); Eric W. Schultze, Bellevue, WA (US)

(73) Assignee: Amazon Technologies, Inc., Reno, NV (US)

(*) Notice: Subject to any disclaimer, the term of this patent is extended or adjusted under 35 U.S.C. 154(b) by 43 days.

(21) Appl. No.: 13/525,010

(22) Filed: Jun. 15, 2012

(51) Int. Cl.
*H04L 29/06* (2006.01)

(52) U.S. Cl.
USPC ............................. 726/23; 726/25

(58) Field of Classification Search
USPC ............................. 726/29, 23, 25
See application file for complete search history.

(56) References Cited

U.S. PATENT DOCUMENTS

| | | | |
|---|---|---|---|
| 7,174,455 B1 | 2/2007 | Arnold et al. |
| 7,383,433 B2 | 6/2008 | Yeager et al. |
| 7,440,415 B2 | 10/2008 | Wild, III et al. |
| 7,630,368 B2 | 12/2009 | Tripathi et al. |
| 7,634,584 B2 | 12/2009 | Pope et al. |
| 7,733,890 B1 | 6/2010 | Droux et al. |
| 7,792,140 B2 | 9/2010 | Droux et al. |
| 7,912,082 B2 | 3/2011 | Yang et al. |
| 7,961,726 B2 | 6/2011 | Wang et al. |
| 7,962,950 B2 | 6/2011 | Choo et al. |
| 7,984,066 B1 | 7/2011 | Kilday et al. |
| 8,484,089 B1 * | 7/2013 | Lin et al. ................ 705/26.1 |
| 2002/0026592 A1 | 2/2002 | Gavrila et al. |
| 2002/0106985 A1 | 8/2002 | Sato et al. |
| 2003/0053441 A1 | 3/2003 | Banerjee |
| 2004/0078371 A1 | 4/2004 | Worrall et al. |
| 2005/0198384 A1 | 9/2005 | Ansari et al. |
| 2006/0262736 A1 | 11/2006 | Dong et al. |
| 2008/0002703 A1 | 1/2008 | Tripathi et al. |
| 2008/0104393 A1 | 5/2008 | Glasser et al. |
| 2008/0267087 A1 | 10/2008 | Beck et al. |

(Continued)

OTHER PUBLICATIONS

Hitchens, M., and V. Varadharajan. "Design and specification of role based access control policies." Software, IEE Proceedings-. vol. 147. No. 4. IET, Aug. 2000.*

(Continued)

*Primary Examiner* — Kambiz Zand
*Assistant Examiner* — Michael Guirguis
(74) *Attorney, Agent, or Firm* — Robert C. Kowert; Meyertons, Hood, Kivlin, Kowert & Goetzel, P.C.

(57) ABSTRACT

Methods and apparatus for provider-arbitrated mandatory access control policies in cloud computing environments are disclosed. A system includes an access manager, and a plurality of resources configurable to provide a plurality of distributed, web-accessible services. Each service has a respective service manager. The access manager determines whether a mandatory access control policy document specified by a service manager of a particular service applies to an administration request, wherein the policy indicates that a permission setting for a resource being used to implement at least a portion of the particular service cannot be modified by a client with administrative rights on the resource. In response to determining that the policy document applies, and that an evaluation of the policy document indicates that an administrative operation specified in the administration request is prohibited by the policy, the access manager rejects the administration request.

26 Claims, 11 Drawing Sheets

(56) References Cited

U.S. PATENT DOCUMENTS

| | | |
|---|---|---|
| 2009/0129385 A1 | 5/2009 | Wray et al. |
| 2009/0190585 A1 | 7/2009 | Allen et al. |
| 2009/0205018 A1* | 8/2009 | Ferraiolo et al. ............... 726/1 |
| 2010/0049637 A1 | 2/2010 | Laventman et al. |
| 2010/0131949 A1 | 5/2010 | Ferris |
| 2010/0132012 A1 | 5/2010 | van Riel et al. |
| 2010/0132016 A1 | 5/2010 | Ferris |
| 2010/0257276 A1 | 10/2010 | Savolainen |
| 2011/0047540 A1 | 2/2011 | Williams et al. |
| 2011/0072486 A1 | 3/2011 | Hadar et al. |
| 2011/0072487 A1 | 3/2011 | Hadar et al. |
| 2011/0087888 A1 | 4/2011 | Rennie |
| 2011/0099616 A1 | 4/2011 | Mazur et al. |
| 2011/0137947 A1 | 6/2011 | Dawson et al. |
| 2011/0264906 A1 | 10/2011 | Pourzandi et al. |

OTHER PUBLICATIONS

U.S. Appl. No. 13/339,985, filed Dec. 29, 2011, Eric W. Schultze.

U.S. Appl. No. 13/408,902, filed Feb. 29, 2012, Christopher Richard Jacques de Kadt.

* cited by examiner

PROVIDER-ARBITRATED MANDATORY ACCESS CONTROL POLICIES IN CLOUD COMPUTING ENVIRONMENTS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources and services to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse service needs, allowing various computing resources and services to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

In many environments, various types of distributed applications may be implemented using virtualized compute and storage resources that may span large numbers of devices potentially spread across multiple data centers. For example, a distributed relational database service may be implemented using a set of virtual compute and storage servers of a provider network that are allocated to the service provider, allowing clients to access the database service from other compute servers of the provider network that are allocated to the clients, where for example the client's web tier or application tier may be executed. At least three parties may be involved in the provision of such services: the clients, the service provider implementing the service, and the provider network operator responsible for the underlying infrastructure resources, each of which may have access rights to various resources involved in the provision of the services. As the sophistication of the services increases, the number of different types of physical and logical resources used to implement a given service may also increase, potentially requiring new access control techniques to ensure efficient service provision and to reduce the likelihood of service interruptions caused by unintentional configuration errors or by malicious users.

Figure 1:
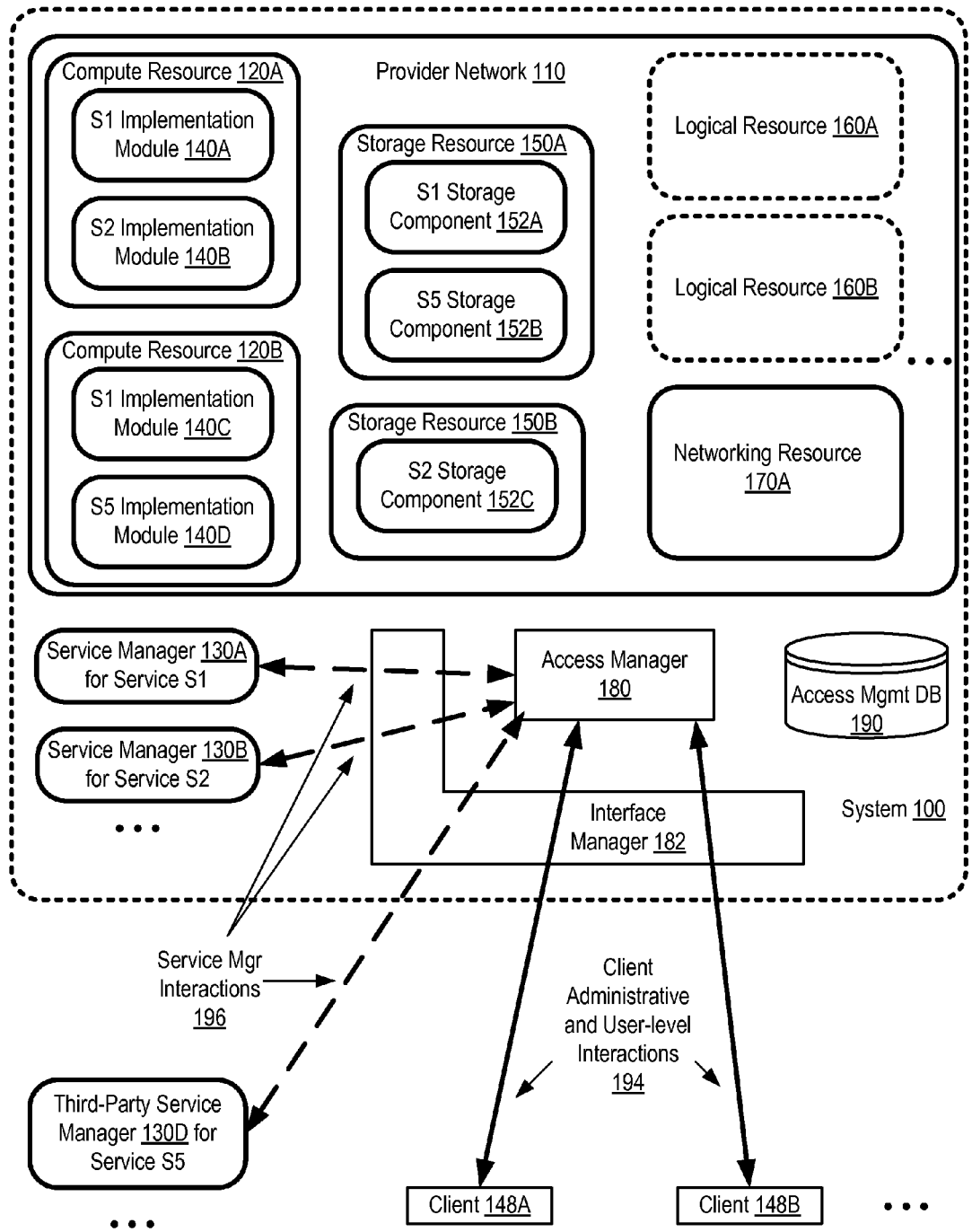
FIG. 1 illustrates an example system environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatus for provider-arbitrated mandatory access control policies in cloud computing environments are described. Networks set up by an entity such as a company or a public sector organization to provide one or more distributed services accessible via the Internet and/or other networks to a distributed set of clients may be termed provider networks in this document. The term "web-accessible service" may be used herein to refer to services accessible over the Internet. The services may include a core set of infrastructure-related services such as cloud computing or storage platforms, as well as more advanced services that are built using the core services, such as for example database services, load balancing services, application deployment services, search services and the like. Such a provider network may include numerous data centers, each comprising potentially large numbers of computing platforms, such as collections of physical and/or virtualized computer servers, storage devices, networking equipment and the like, needed to implement and distribute services offered by the provider. In some provider networks, resources configured on the platforms may in some embodiments be offered for reservation by (and allocation to) clients in units called "instances," such as virtual or physical compute instances or storage instances. A virtual compute instance may, for example, comprise one or more servers with a specified computational capacity (which may be specified by indicating the type and number of CPUs, the main memory size, storage device number and size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices and the like.

In at least some embodiments, some or all of the distributed, web-accessible services may have respective service managers responsible for overall administration and coordination of the corresponding service. For some services, a service manager may itself be implemented using resources of the provider network—e.g., program instructions implementing service manager functionality for a particular service may be executed on one or more compute servers of the provider network. For other services, at least a portion of a service manager may be implemented outside the provider network—e.g., an entity such as a third-party content management service provider may use computing devices in an external data center to host a service manager for a content management service that uses service modules running on resources within the provider network. In some cases third-party service managers may also be fully implemented using the resources of the provider network, without recourse to external resources. Each service may be provided using a combination of a potentially large set of resources in some embodiments—including, for example, physical or virtual compute/storage/networking resources or instances implemented on platforms distributed across devices of one or more data centers, as well as logical resources implemented as data structures or objects within various types of volatile and/or persistent storage in the provider network. In one embodiment, at least some if the services may be multi-tenant services. The term "multi-tenant" service, as used herein, refers to a service that provides each of a plurality of clients or users a respective secure and exclusive virtual computing environment, such that for any given application supported by the service, each client is provided a customizable virtual application instance. In some embodiments, some or all of the services provided may be independently billable—e.g., a client that subscribes to or uses two services managed by respective service managers, such as a database service and a load balancing service, may be presented with distinct billing line items for each service. In some implementations, some independently billed services may depend on other independently billed services—e.g., a data set import/export service may rely on a compute instance service and/or a block storage service, resulting in the possibility of "service stacks" comprising multiple services reliant upon, or used by, other services. In one such implementation, clients may be billed separately for each service of a service stack that they use, even if some core service is only used indirectly as a result of a dependency of a high-level service on that core service. In other implementations, billing for at least some core services may be consolidated with the billing for higher-level services.

In one embodiment, each resource in the provider network, whether physical or virtual, may have a designated owner with a certain set of ownership rights, and the ownership of certain types of resources may change over time. For example, in one embodiment a client may request that a virtual compute instance with a specified performance capability and a specified software stack (e.g., a desired version of an operating system) be instantiated or launched for the client. An access manager of the provider network may, in response to the request, launch (e.g., boot up) a virtual compute instance for the client and assign ownership rights for that instance to the requesting client. The designation of a client as an "owner" of a resource may have a number of implications in such an embodiment, including for example that any charges incurred as a result of a use of the resource may be billed to the client (e.g., to a billing account associated with the client's authorization or login account), and that the client may be allowed to initiate, request or perform a specified set of administrative operations on the resource. In at least some embodiments, a given client account may have a number of users or user accounts affiliated with it, and some of the ownership rights and privileges may be granted to a designated set of those users. The phrases "client owner of a resource" or "owner client of a resource" may be used herein to refer to a user affiliated with the client account and granted at least a subset of ownership rights to the resource, and the term "client" may be used to refer to a user affiliated with a client account. In the case of a physical or virtual compute instance, for example, the owner may typically be granted "root" or "administrator" access to the instance by default, allowing the owner to make various types of configuration and administration decisions, such as which user accounts if any are allowed to access the instance, which applications are installable and where on the storage associated with the instance, and so on. In some embodiments, ownership of at least some resources used in providing a given network-accessible service may be granted to a service manager responsible for the service (e.g., to an authorization or login account created for the service manager, with an associated billing account). For example, a set of compute instances and/or storage instances may be required to implement the functionality of a queued messaging service, and the service manager for the queued messaging service may be designated as the owner of those compute and/or storage instances.

In at least some embodiments, providing unrestricted access control permissions to an owner of a particular resource may not be the best approach with regard to ensuring stable and secure provision of a service. For example, in one such embodiment, network connectivity between specified sets of compute instances may be configurable using a type of logical resource called "interface records" (which may also be referred to herein as "virtual network interfaces" or "network interface records"). An interface record (IR) may comprise various metadata elements such as one or more Internet Protocol (IP) addresses and a set of security parameters, and may support several different types of administrative operations including "attach" and "detach" operations. As a result of "attaching" an IR with an IP address IP1 to a compute instance C, network traffic addressed to IP1 may be directed to C (i.e., as a result of the attachment, a physical network interface attached to a hardware platform on which C happens to be running accepts IP packets with IP1 as the destination IP address), and network traffic originating at C may have IP1 as the designated origin IP address. Conversely, when an IR with IP address IP2 is "detached" from a compute instance C2, C2 can no longer receive traffic targeted at IP2, and traffic originating from C2 no longer indicates IP2 as its origin address.

In one embodiment, a database service manager DSM may implement various pieces of database functionality using a set of compute instances DBI1, DBI2, . . . and may wish to allow network access via interface records to the database functionality from a database client compute instance DCI1 owned by a particular client C10. The particular client may be designated as the owner of an IR IR1. As the owner, client C10 may be billed for the use of IR1, based on the specific pricing policies in use for IR1, such as pricing based on actual network traffic, and/or a fixed fee for activating the interface record. Service manager DSM may allow network connectivity between the client's instance DCI1 and the database compute instances DBI1 by allowing the attachment of IR1 to DBI1, thus permitting database-related network traffic to flow between the client's instance and an instance where the database service is implemented. However, despite the designation of the client C10 as the owner of the interface record IR1, the database service manager DSM may wish to prevent detachment of IR1 from DBI1 by the client C10. Such a detachment by C10 may, for example, potentially lead to undesired and/or unpredictable behavior, such as hanging or aborts of in-progress transactions, deadlocks, and the like in some embodiments. Furthermore, by restricting the set of operations that clients like C10 can perform on the interface record, the database service manager DSM may be able to reduce the complexity of the database code itself—for example, there may be less need to keep track of the state of a network connection, or to check whether a connection endpoint is authorized to use the connection. In such embodiments, it may be advisable to implement access control policies to prevent resource-owning entities (such as client C10 in the current example) from initiating or performing certain types of operations (such as detach operations) on certain types of resources (such as IR1). Such access control policies may be termed "mandatory" access control policies in some embodiments. The term "mandatory access control policy", as used herein, may refer to a policy that indicates that a permission setting (e.g., a permission setting allowing detach operations in the above example) associated with a particular type of administrative operation on a resource being used to implement at least a portion of a particular service cannot be modified by a client to whom a set of owner administrative rights to the resource have been granted. A number of additional example scenarios in which mandatory access control policies may be desirable will be provided below. The abbreviation MACP may be used to refer to mandatory access control policies in the remainder of this document.

In some implementations, MACPs may be applied at more than one granularity—e.g., collectively to groups of resources or to resource types, or individually to specific, uniquely identifiable resources, depending on the parameters specified for the MACP. In addition, in some embodiments MACPs may also be parameterized so that they are only applicable for operations attempted by a given set of authorization accounts—e.g., only a specified set of user accounts may be prohibited from certain administrative operations. In at least one embodiment, a document format designed for specifying access control permissions and/or prohibitions may be used for MACP definition and setup. An MACP specification standard providing details of the document format syntax may be selected for use in the provider network. For example, in one such embodiment the MACP document may comprise a collection of "<principals, actions, resources, constraints>:AuthorizationResult" tuples expressed in JavaScript Object Notation (JSON), Extensible Markup Language (XML) or any other appropriate format. The AuthorizationResult in such a scenario may indicate, for example, whether a particular operation (from among the actions specified in the tuple) should be allowed or prohibited, when attempted by one of the specified principals (e.g., users) on one of the specified resources under the specified constraints. The constraints entry may indicate specific conditions under which the AuthorizationResult is to apply in some embodiments. For example, one constraint representing a time window "8 am to 8 pm every day" may be specified to indicate that the AuthorizationResult is applicable only during certain times of day to the specified actions on the specified resources by the specified principals, and another constraint may limit applicability of the AuthorizationResult to action requests from specified IP addresses. In such embodiments where documents formatted according to some agreed-upon specification are used for MACP definition, the access manager 180 may include a parsing engine to evaluate MACPs (e.g., to determine whether an MACP applies to a given administration request, to validate that an MACP conforms to the specification, and so on.)

In some embodiments, an access manager of the provider network, responsible for controlling access to various resources of the provider network usable to provide a plurality of distributed web-accessible services, may be configurable to support parameterized mandatory access control policies. When the access manager receives a particular administration request or operation request from a client, the access manager may determine whether an MACP specified by a service manager of one or more of the services applies to the request. For example, the access manager may look up applicable policies in an access management database that contains access control metadata for various resources, services and administrative operation categories in some embodiments. If the access manager determines that access permissions on one or more operations requested are governed by one or more MACPs, the access manager may further determine whether any of the operations are prohibited under the applicable MACPs. In embodiments where the MACPs are stored as specially-formatted documents as described above, the access manager may parse and/or evaluate the MACP documents as needed to determine applicability of the MACPs and whether the operations are prohibited. If an operation is found to be prohibited by an MACP, the access manager may reject the operation, or may reject the entire request. If a requested operation is permitted under all applicable MACPs, in some embodiments the access manager may determine whether any other access control policies (such as discretionary access control policies (DACPs) whose permissions can be changed by the owner of the affected resource) apply to the requested operation, and verify that the operation is permitted under the other policies. If the requesting client has the required permissions or privileges for the requested operation, the requested operation may be performed. In some embodiments, if a particular administration request comprises multiple operations, and even one of the operations is prohibited by an MACP or by another applicable access control policy, the entire set of operations may be rejected; in other embodiments, each operation of the request may be dealt with separately, i.e., some operations may be rejected while others may be accepted. In one implementation the access manager may allow the requesting client to indicate a preference for whether all the operations in a particular request should be accepted or rejected as a group, and may respond in accordance with the client's expressed preference.

In one embodiment, the access manager may store MACP-related metadata in a persistent repository. Such metadata may include, for example an indication of mappings between a set of entities including: (a) one or more distributed services implemented at least partially within the provider network; (b) one or more resource categories of resources usable to implement the services; (c) one or more types of administrative operations implementable on resources of the one or more resource categories; (d) one or more trusted access controllers authorized to specify mandatory access control policies for the one or more resource categories and the one or more types of administrative operations; or (e) one or more mandatory access control policies in effect for the one or more resource categories. The access controllers allowed to specify MACPs may include different types of entities in different embodiments: for example, in one embodiment only selected service managers of the services may be authorized to specify MACPs, while in other embodiments a selected set of client accounts may also be allowed to specify MACPs. In one implementation, the metadata may also include references or pointers to other services associated with the given service—e.g., for a given service S-A, the metadata may list another service S-B which relies upon S-A, and a third service S-C on which S-A depends. In one embodiment, the MACP metadata may be stored in such a way that it can be searched or indexed along multiple dimensions—e.g., the access manager may be able to determine all the MACPs applicable to a given resource or resource type, to a given operation type, or to a given service. The access manager may refer to the stored MACP metadata when attempting to determine whether a given operation request or administration request is covered by an MACP. In some implementations metadata for non-mandatory or discretionary access control policies may also be stored in the same repository as metadata for MACPs. When specifying an MACP to an access manager, a service manager (or other trusted access controller) may specify various parameters associated with the policy in some embodiments—such as, for example, identifiers of one or more specific resource instances to which the policy is to be applied, time periods during which the policy is to remain valid, and so on.

At least in some embodiments, the access manager may support MACPs requested by external or third-party service managers. As noted above, in some embodiments a third-party provider may wish to utilize some resources of the provider network to implement a service for its clients. In some implementations a third-party provider may implement at least a portion of its service manager on devices outside the provider network, while in other implementations the service manager for the third-party service may also be implemented entirely using the resources of the provider network. In some implementations the same types of MACP-related services may be available to the provider network's service managers as are available to third parties, while in other embodiments the access manager may support different levels of MACP-related functionality for service managers operated by the owner of the provider network than for service managers operated by third parties (i.e., parties other than the owner of the provider network). In one embodiment, a subcomponent of the access manager, or a separate interface manager, may be responsible for implementing one or more programmatic interfaces for MACP-related operations. For example, an MACP management interface may be implemented in the form of one or more application programming interfaces (APIs), web pages, graphical user interfaces or command-line tools, allowing service managers or other trusted access controllers to specify various details and parameters of MACPs in one embodiment. A client-facing programmatic interface or set of interfaces may also or instead be implemented in another embodiment, allowing clients to ascertain which if any MACPs apply to the various resources that they own or have an interest in, and the various services that they utilize.

In at least one embodiment, where for example a given service is implemented using multiple types of resources, a plurality of different MACPs may apply to the operation or operations of a given administration request. A single trusted access controller may request that several different MACPs be applied, or different trusted access controllers may each request the access manager to apply respective sets of MACPs. Depending on the policy combination protocol in effect, the access manager may take different actions when multiple MACPs are applicable to a given operation. In some embodiments, the access manager may apply each of the MACPs in turn. In other embodiments, the access manager may be given the additional responsibility of generating a composite MACP that logically combines the different, potentially conflicting MACPs that may apply to a given type of administration request. In one implementation, if the access manager determines that an MACP M1 conflicts with (e.g., sets conflicting permissions on the same type of operation) another MACP M2, the access manager may attempt to communicate with one or both trusted access controllers to resolve the conflict—e.g., by dropping or deleting one of the conflicting MACP components.

In one embodiment, a service manager may be operable to impersonate a client for whom an MACP is to be applied, during the allocation of a resource covered by the MACP. For example, the access manager (or some other entity responsible for allocating resources of the provider network to clients, such as a service manager of the service responsible for provision of the resource) may receive a resource acquisition request to assign ownership of a particular resource to a specified client. The service manager responsible for implementing a service that will eventually be provided using the resource being acquired may transmit the resource acquisition on behalf of the client to whom the ownership of the resource is to be granted, e.g., the service manager may indicate that the client is sending the resource acquisition request rather than the service manager, so that resource ownership is set appropriately. In other embodiments, the service manager may not need to impersonate the client per se, but may simply be able to indicate in the resource acquisition request that the resource ownership be granted to the client. The service manager may then perform any other desired configuration on the resource, e.g., the service manager may request the access manager to assign a particular MACP to the resource. The service manager may then allow the owner client to access the resource to obtain the desired service, and to make any desired configuration changes in accordance with the ownership rights granted to the owner client. A resource to which ownership is granted to a client as a result of a resource acquisition request from an entity other than the client, where the sender of the acquisition request (i.e., the "requester") retains some management rights to the resource at least temporarily, may be referred to as a "requester managed resource (RMR)" in some embodiments.

Example System Environment

FIG. 1 illustrates an example system environment, according to at least some embodiments. The system 100 comprises a provider network 110 with a plurality of resources of various types (including compute resources 120, storage resources 150, networking resources 170, and logical resources 160), service managers 130 for various types of network-accessible distributed services implemented using the resources, an access manager 180 and an interface manager 182. In the depicted example system 100, compute resources 120, which may for example comprise virtual compute instances running any desired virtual machine image, are configurable to host executable service implementation modules for various services. As shown, compute resource 120A hosts implementation module 140A for service S1, as well as implementation module 140B for service S2, and compute resource 120B hosts implementation module 140C for service S1 and implementation module 140D for service S5. Storage resources 150 may also comprise storage components used by various services—for example, storage resource 150A comprises storage component 152A used by service S1 and storage component 152B of service S5, while storage resource 150B comprises storage component 152C of service S2. Logical resources 160 (which may for example comprise representations, storable in volatile or non-volatile memory devices, of various data structures comprising metadata and/or state information associated with other resources and with various services) and networking resources 170 may also be used, e.g., in combination with compute and/or storage resources for providing the various services shown.

In addition to service managers (such as 130A and 130B) that are implemented using resources owned by the provider network operator, in some embodiments external third-party service managers such as 130D may also be supported. In some embodiments third-party-owned services may also be managed by service managers implemented using the resources of the provider network. Each service manager may be responsible for coordinating the implementation of a respective distributed service accessible via the Internet or other networks to clients 148 (e.g., 148A and 148B)—e.g., a given service S1 may be built using a combination of compute, storage, networking and logical resources of provider network 110, with implementation modules residing on a dynamically-changing set of compute resources 120, accessing data resident on storage components of various storage resources 150, and so on. In one embodiment the resources of the provider network may be classified into two categories—(a) "data-plane" resources focused on client applications and service implementation and (b) "control-plane" resources focused on administration of the data-plane resources and the services. In such an embodiment at least some of the service managers may be hosted on control-plane resources. In some cases a given service may also rely upon resources external to the provider network: e.g., a service S5 managed by third-party service manager 130D may use a resource hosted within a third-party network, in addition to some resources within the provider network 110.

Access manager 180 may be responsible for managing administrative access permissions, roles and capabilities for the various resources of the provider network in the depicted embodiment—e.g., access manager 180 may maintain records indicating which entities (e.g., clients 148, or service managers 130) have rights to access various resources (e.g., compute resources 120, storage resources 150, logical resources 160 and networking resources 170), which specific access policies apply in each case, which types of operations are permitted and which are prohibited, and so on. The records may be stored in a persistent repository such as access management database 190 in some embodiments. The access-related information maintained by access manager 180 may include the designated owners for various resources—e.g., the client or service manager to whom ownership rights are granted and billing responsibility is assigned for each resource type or resource instance, as well as the specific set of operations permitted as part of the ownership rights. A given resource may be owned by either a client 148 or a service manager 130 in the embodiment shown. At least some service manager-owned resources, such as a compute resource 120 configured to implement back-end database functionality of a database service, may be dedicated for implementation modules or storage components of the corresponding service alone. Other resources, such as a subset of service manager-owned resources, or client-owned resources, may comprise modules and/or components of more than one service (e.g., compute resource 120A comprises implementation modules for services S1 and S2).

Interface manager 182 may be responsible for implementing one or more programmatic interfaces for various types of interactions related to access control in the depicted embodiment, e.g., interactions 196 between service managers 130 and access manager 180, and/or client administrative and user-level interactions 194. The programmatic interfaces may include, for example, different sets of application programming interfaces (APIs)—e.g., one set of APIs for MACP management and setup, and another set of APIs usable by clients. In some embodiments a set of web pages or web sites, graphical user interfaces, command-line tools, and the like may be implemented in addition to, or instead of, the APIs. In some embodiments, instead of a standalone application manager 182, a subcomponent of the access manager 180 may be responsible for one or more interface implementations. Service manager interactions 196 may include, for example, the specification by a service manager of various parameters for an MACP, such as the types of operations and resources to which the MACP is to be applied, and the specific permission settings of the MACP that cannot be modified by the owner of the resource. Client interactions 194 may include, for example, the submission of administration requests comprising one or more operation requests, queries regarding the status or description of various resources, views of MACPs applicable to client-owned resources, and so on.

In the embodiment illustrated in FIG. 1, the access manager 180 may, in response to an administration request, determine whether an MACP specified (e.g., via a policy document formatted in JSON, XML or some other language) by a service manager 130 applies to the request, where the MACP indicates that a permission setting for a particular type of administrative operation on a resource used to implement at least a portion of the service managed by the service manager 130 cannot be modified by an owner of the resource. If the access manager 180 determines that one or more MACPs applies to the administration request, and that an administrative operation indicated in the administration request is prohibited in accordance with the one or more MACPs, the access manager 180 may reject the administration request. In embodiments where MACP documents are used, the access manager may have to parse or evaluate the documents to ascertain whether a requested operation is prohibited. The resource to which the MACP applies may have been allocated to the client as a result of an acquisition request generated by the service manager on behalf of the client, without the client having to request acquisition of the resource. If the MACPs do not prohibit a requested operations, and no other access control policies (such as discretionary access control policies applicable to the resource) do not prohibit the operations either, the access manager 180 may accept the administration request, e.g., the requested operations may be initiated or performed.

In order to determine which, if any, operations are covered by various MACPs, the access manager 180 in some embodiments may refer to records (which may for example be stored in database 190) of mappings or associations between several types of entities: individual resources or resource groups, types of administrative operations supported on the resources, a set of distributed services, trusted service managers or other access controllers authorized to specify MACPs for the resources used for various services, and a set of MACPs currently in effect. For example, when a request to perform administrative operation A1 on resource instance R1 is received, in one implementation the access manager 180 may look up a list of access control policies, including MACPs as well as other discretionary policies, indexed by or searchable by a unique resource identifier of the resource instance A1, and see if administrative operation A1 is allowed or prohibited by the set of applicable policies. Alternatively, depending on the implementation, the access manager 180 may conduct a search or lookup indexed by the type of administrative operation A1, to determine whether there are any MACPs applicable to that type of operation. In some implementations an optimizer subcomponent of access manager 180 (not shown in FIG. 1) may be responsible for generating an efficient lookup plan to identify applicable MACPs for a particular operation or request—e.g., based on statistics of how long it took to conduct similar searches or lookups in the past, the number of different resources, operations and policies being managed, and so on. MACPs may be applied on behalf of a wide variety of service managers 130 in some embodiments; examples of the different types of services supported are discussed below in further detail.

In one embodiment, the access manager 180 may also be responsible, in scenarios where multiple MACPs may apply to a given set of operations or to a given resource, to generate composite MACPs that combine the various permission setting constraints of the individual MACPs. Multiple MACPs, potentially covering the same resource types or operation types, may be specified by the same service manager 130 or access controller in some embodiments. In some implementations, if the access manager 180 determines that two MACPs conflict with one another—e.g., if a particular type of operation on a particular resource instance is permitted under one MACP and prohibited under another MACP—the access manager 180 may be responsible for resolving the conflict. In one such implementation the access manager may notify the access controllers responsible for specifying the MACP about the conflict, and request that the conflict be resolved. In another implementation, the access manager 180 may simply reject or disregard one of the conflicting MACPs—e.g., the one that was specified earlier may be disregarded and the one that was specified later may be enforced.

Example Catalog of Supported Services

Figure 2:
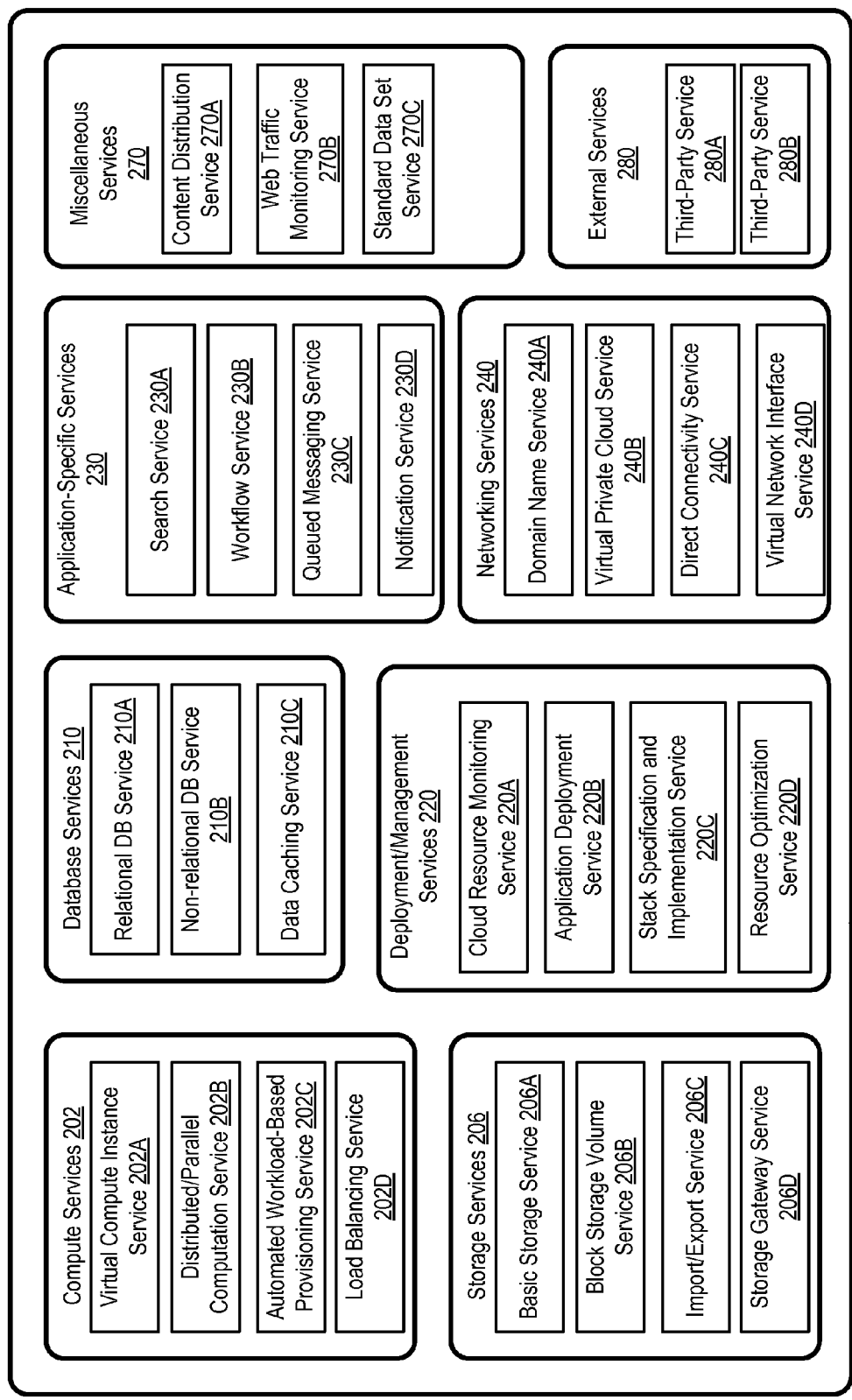
FIG. 2 illustrates an example set of distributed services that may be available to clients of a provider network, according to at least one embodiment.

FIG. 2 illustrates an example set of distributed services that may be available to clients of a provider network 110, according to at least one embodiment. As shown, service catalog 200 may include various compute services 202, storage services 206, database services 210, deployment/management services 220, application-specific services 230, networking services 240, and miscellaneous services 270. Each service may have its own service manager 130, and each service may utilize one or more resources of the provider network to implement and/or provide access to the service functionality over the Internet and/or other networks external to or included within the provider network. It is noted that although some or all of the services may be accessible to clients via the Internet, the Internet or other external networks may not be required for clients to access the services, at least in some embodiments. For example, the clients may themselves be running portions of their applications on compute resources within the provider network, and some of the services may be accessible to the client applications using networking infrastructure of the provider network, without having to access the Internet or any other network outside the provider network. Each service may be separately billable in some embodiments—e.g., a given client may be billed one amount for usage of block storage volumes (provided by service 206B), and a different amount for resource monitoring (provided by cloud resource monitoring service 220A), even if the block storage volumes were among the resources monitored. The service manager 130 of any of the services may request (e.g., in an MACP setup request sent to access manager 180) that an MACP be applied for certain operations on certain resources used for or associated with the service. In some embodiments, as noted earlier, the access manager 180 may maintain records of the trusted set of service managers 130 or other entities from whom MACP requests are acceptable for various (resource, operation) combinations.

In the illustrated example, the majority of services shown are internally managed within the provider network 110—e.g., the service managers for the majority of services are implemented entirely within the provider network and operated on behalf of the owner of the provider network. As shown, the service catalog 200 may also include a set of externally-managed or externally-owned services 280, including various third-party services such as 280A and 280B that are owned, managed or provided at least in part by entities outside the provider network. The types of operations to which MACPs may apply may be referred to as "control-plane" operations in some embodiments, indicating that they are administrative operations that may be implemented using special control-plane interfaces—e.g., requests for such operations may be transmitted to special administrative network ports.

Various services of the service catalog 200 may rely upon, or be dependent upon, other services of the catalog in some embodiments. For example, the virtual compute instance service 202A may provide compute instances that may be used to implement distributed/parallel computation services 202B (e.g., services based on the Map-Reduce data processing paradigm or on various other distributed computing techniques). Similarly, an automated workload-based provisioning service 202C may allow clients 148 to automatically scale up (or scale down) their computing capacity as the workload level changes, e.g., by commissioning additional virtual compute instances from compute instance service 202A (or decommissioning existing virtual compute instances). A load balancing service 202D may allow clients to automatically distribute incoming application traffic across multiple virtual compute instances provided by service 202D.

Supported storage-related services may include a basic storage service 206A providing a fully redundant data storage infrastructure in some embodiments, allowing clients 148 (or other service managers) to reliably store and retrieve data for various applications. A block storage volume service 206B may cater to the storage needs for applications requiring block-level storage that may need to be persisted independently of the compute instances that generate or process the stored data. Import/export service 206C may allow clients 148 or other services to move large amounts (e.g., terabytes or petabytes) of data into and out of the provider network 11, e.g., using portable storage devices. Using storage gateway service 206D, a client may be able to connect a storage appliance located in the client's own data center with provider network storage (e.g., block storage volumes from service 206B), e.g., to provide seamless and secure integration between the client organization's on-premises environment and the provider network storage infrastructure.

In the illustrated embodiment, the service catalog 200 may include several types of database-related services 210, including a network-accessible relational database service 210A, a non-relational database service 210B (such as a "NoSQL" database, or an object oriented database), and a caching service 210C that provides a scalable in-memory cache. Some or all of the database-related services 210 may use computational resources provided by virtual compute instance service 202A and/or storage resources obtained from services 206A or 206B.

Cloud resource monitoring service 220A may provide performance and other metrics for various resources of the provider network 110, including for example virtual compute instances obtained from service 202A and storage obtained from basic storage service 206A or block storage volume service 206B. Application deployment service 220B may automate deployment-related operations for client applications to be deployed to virtual compute instances, such as capacity provisioning, load balancing, automated scaling, and application health monitoring, e.g., using some combination of the other services of the catalog 200. Stack specification and implementation service 220C may allow clients to specify a collection of related resources of the provider network and provision them in an orderly and predictable manner. One or more resource optimization services 220D may be provided in some embodiments, e.g., to support client requests to reduce costs, improve performance, or achieve other specified goals by analyzing metrics gathered from the client's resources and recommending actions such as resource replacement, resource relocation, and so on.

Search service 230A may allow fast search capability to be integrated into other services or into client applications. Workflow service 230B may help coordinate processing steps in various client applications and/or services, and manage distributed execution state. Queued messaging service 230C may provided hosted queues for storing messages as they travel between systems. Notification service 230D may allow users to set up, operate and send notifications from the provider network to any specified network-accessible destinations.

Domain name service 240A may support a highly available and scalable implementation of a web-accessible domain name system. Virtual private cloud service 240B may allow the provisioning of a private, isolated network using the resources of the provider network, allowing full control of the network topology configuration within the private network to the owner of the private network. Using the virtual private cloud service, a client 148 may define a virtual network topology that resembles a traditional network that might be implemented at a client data center. Service managers 130 may set up their own virtual private clouds in some embodiments—for example, the relational database service 210A may implement database functionality within one or more virtual private clouds comprising compute instances and storage obtained from services 202A and 206A, and control access to the virtual private cloud using virtual network interface service 240D. Virtual network interface service 240D may support the creation of network interface records (IRs), where each IR has one or more IP addresses and some security settings, and where IRs may be attached to virtual compute instances to enable network traffic to and from the virtual compute instances using the IR's IP addresses. Detaching an IR from a compute instance may prevent network traffic targeted at the IR's IP address from reaching the instance. Direct connectivity service 240C may allow dedicated network links to be set up between client premises and the provider network.

Content distribution service 270A may allow clients to distribute content with low latency to a global network of edge locations. Web traffic monitoring service 270B may monitor web traffic patterns and provide analysis of the traffic to subscribing clients. Standard data set service 270C may provide clients with various typically large data sets (such as data on the human genome, climate data, or census data) that can be analyzed by the client's analysis tools and applications; the data may be supplied using one of the storage services 206. For example, the data set may be provided on a block storage volume obtained from service 206B. Various other services may be implemented and managed internally (within the provider network 110) or externally (e.g., by third party service managers) in different embodiments. In at least some embodiments, some of the services may be bundled as pre-packaged "appliances", such that to a client using the service, the service appears to be provided by a single virtual appliance, even though the service is actually implemented using a number of different resources, some of which may have been acquired for the client by the "appliance" service manager without the client explicitly requesting the resources, or even being aware that the resources were necessary before the service was requested. For example, in one such embodiment, the service manager of a relational database service 210A may provide a preconfigured "database appliance" to a client 148 that desires to utilize database functionality. Behind the scenes, to provide the functionality to the client, the database service manager may have acquired several resources such as virtual compute instances, storage instances, network interfaces and the like on behalf of the client, and designated the client as the owner of the resources, without requiring the client to submit any allocation requests for the resources. As noted earlier, the various service managers (including "appliance" service managers that may acquire resources on behalf of their clients) may utilize the MACP support functionality provided by the access manager 180, described above, to control administrative operations on the respective sets of resources used for the services.

MACP-Related Interactions with the Access Manager

Figure 3A:
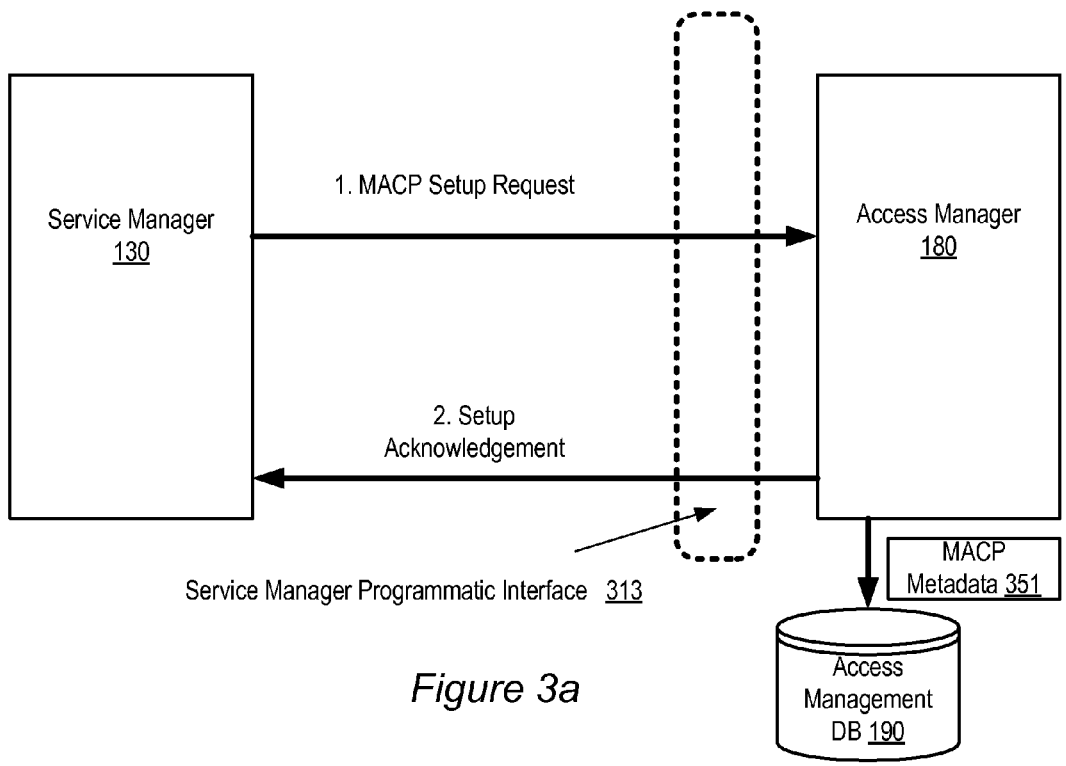
FIG. 3a illustrates an example interaction between a service manager and an access manager.
Figure 3B:
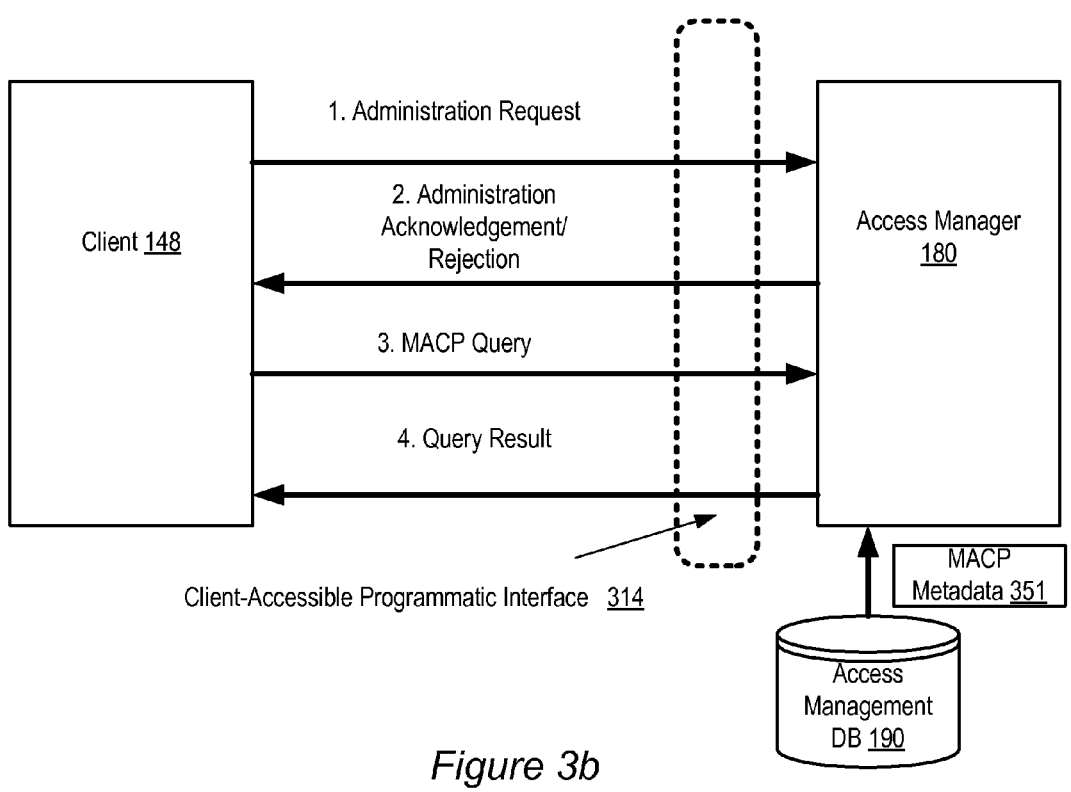
FIG. 3b illustrates example interactions between clients and an access manager, according to at least some embodiments.

FIG. 3a illustrates an example interaction between a service manager 130 and an access manager 180, and FIG. 3b illustrates example interactions between clients 148 and access manager 180, according to at least some embodiments. As shown by the arrow labeled "1" in FIG. 3a, a service manager 130 may send an MACP setup request to the access manager, indicating for example the specific resources or the resource types to be covered, the operations to which access is to be restricted, and so on. The service manager 130 may utilize one or more programmatic interfaces 313 (e.g., one or more APIs implemented by interface manager 182) to submit the setup request. In one simple implementation, for example, an API call logically equivalent to the following may be used:

RequestStatus
   requestStatus=setupMandatoryAccessControlPolicy
   (TrustedAccessController
   T,
   ResourceDescriptor R,
   OperationDescriptor O,
   ImmutablePermissionsDescriptor I);

In the above example, the service manager 130 sending the request may be identified by the TrustedAccessController T. The permissions that cannot be changed by the resource owner of the resource described by ResourceDescriptor R for operations specified in the OperationDescriptor O may be specified in the ImmutablePermissionsDescriptor I.

Upon receiving the request, in the illustrated embodiment the access manager 180 may perform one or more request validation operations, e.g., to ensure that the specific service manager 130 requesting the MACP enforcement is among the trusted service managers allowed to submit MACPs for the specified operations. If the validation succeeds, the access manager 180 may store metadata 351 for the MACP in access management database 190 in some embodiments. The access manager 180 may transmit an acknowledgement back to the requesting service manager 130, as indicated by the arrow labeled "2" in FIG. 3a, indicating that the requested MACP has been set up. In the example API call shown above, the requestStatus field may be used to indicate the success or failure of the setup request. It is noted that in some embodiments, web-based interfaces logically equivalent to APIs may also be provided for MACP setup requests, e.g., to allow clients or administrators that have been designated as trusted access controllers to submit the requests.

A client 148 may submit an administration request in the illustrated embodiment, as indicated by the arrow labeled "1" in FIG. 3b. The administration request may include one or more operations, such as a requested configuration change allowing or disabling access to a resource. A client-accessible programmatic interface 314 may be used to submit the administration request in some embodiments. When the access manager receives the administration request, the access manager may in some implementations attempt to retrieve MACP metadata 351 for the requested operations from the access management database 190, e.g., if the required metadata is not already present in the access manager's memory. The access manager 180 may determine whether any MACPs apply to the requested operation(s). If any MACPs do apply, and if any of the requested operations are prohibited by the MACPs, the request may be rejected in some embodiments. If the operations are permissible by the MACPs and by any other access control mechanisms in use (such as various discretionary access control policies), the operations may be performed as requested, either by the access manager 180 itself, or by some other entity such as a configuration manager responsible for implementing the requested operation once the client's access rights have been verified. In either case, whether the administration request is accepted or rejected, the access manager 180 may send a response to the administration request—e.g., a rejection notification or an acceptance acknowledgement may be sent, as indicated by the arrow labeled "2" in FIG. 3b.

The access manager 180 may also accept various other types of MACP-related requests in some embodiments, such as MACP queries requesting information about the in-effect MACPs for a specified resource or service. In response to such an MACP query (as indicated by the arrow labeled "3" in FIG. 3b), the access manager 180 may look up the required information from the access management database 190, and provide a query result back to the requesting client, as indicated by the arrow labeled "4". In some embodiments, an MACP may prohibit the access manager from displaying its details to clients 148. In such an embodiment, the client-accessible interface 314 may simply prevent the client from submitting such a query, or, alternatively, the access manager 180 may allow clients to submit such queries but may respond with a notification that the requested details cannot be provided. In one embodiment, when an administration request from a client is rejected as a result of an application of an MACP, the access manager 180 may provide an error message to the client, providing a pointer (such as a web link) or a reference to additional information about the possible reasons for the rejection (such as an explanation that an MACP was in effect).

Example MACP Use Cases for Cloud-Provided Services

Figure 4A:
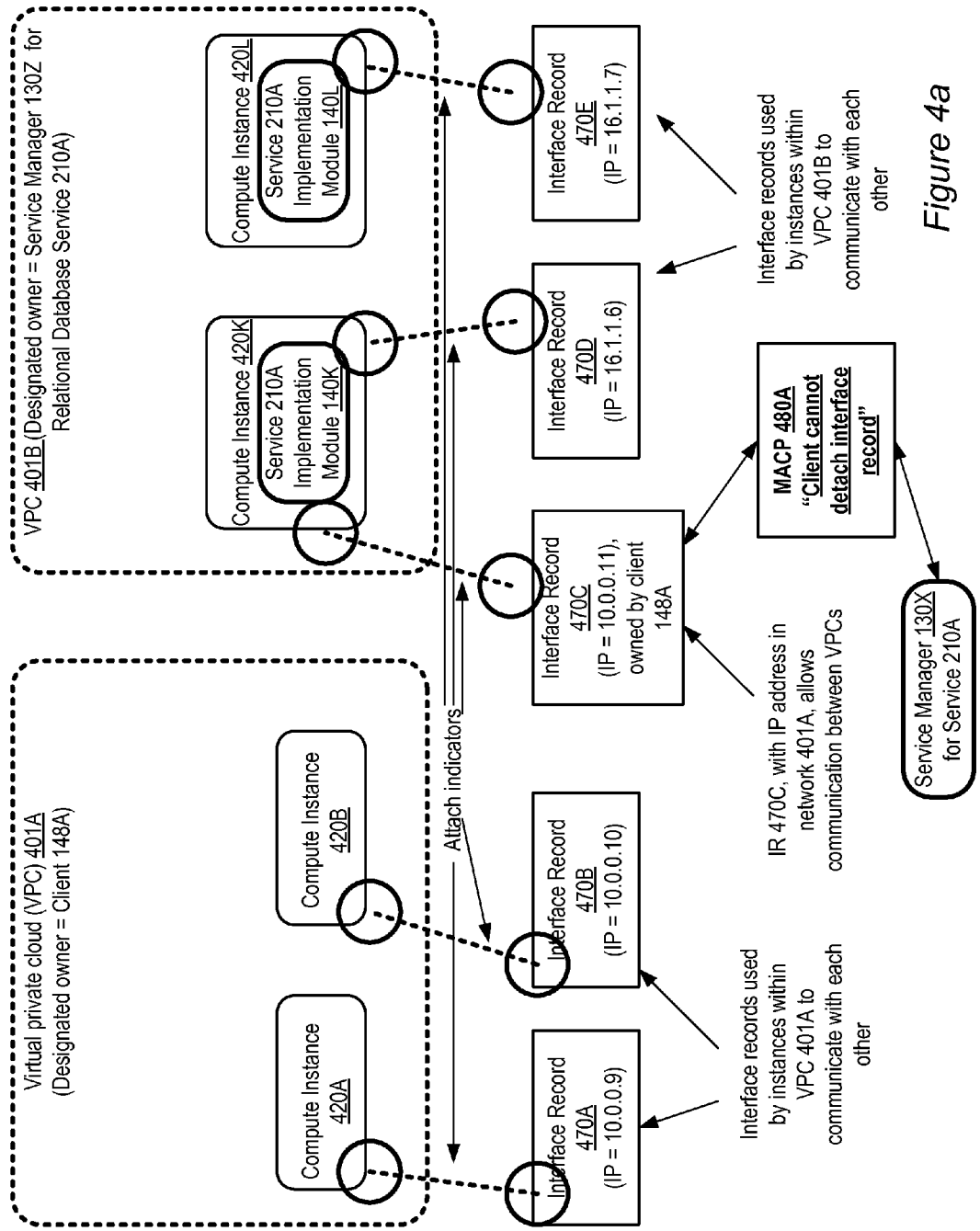
FIGS. 4a, 4b and 4c illustrate respective examples of mandatory access control policy use within a provider network, according to some embodiments.
Figure 4B:
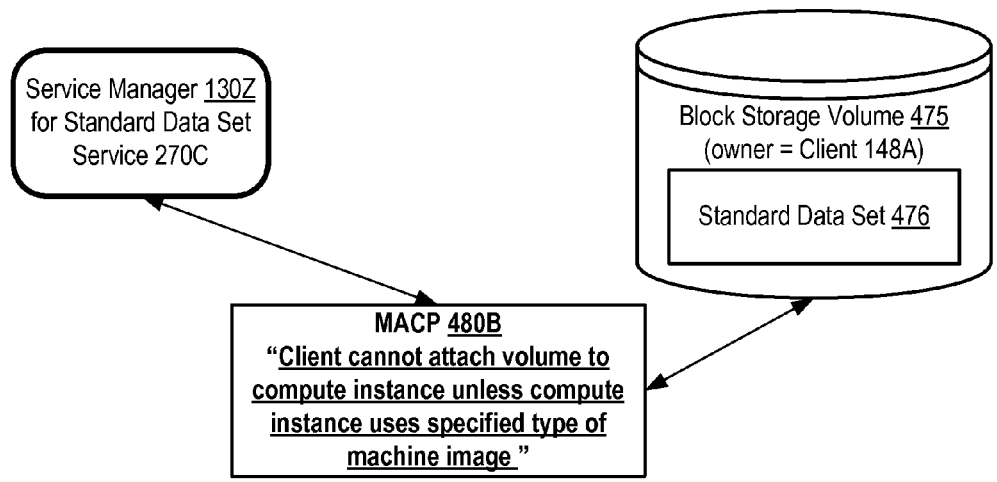
Figure 4C:
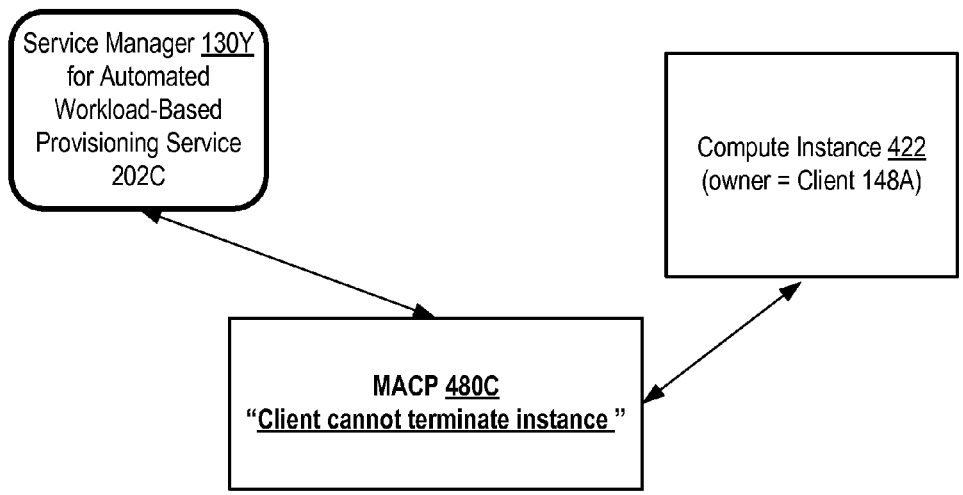

FIGS. 4a, 4b and 4c illustrate respective examples of MACP use within a provider network 110, according to some embodiments. FIG. 4a illustrates an MACP that may be applied to client-owned interface records used for providing access to a relational database service 210A implemented (at least in part) in one virtual private cloud (VPC) 401B, from client-owned compute instances in another VPC 401A. A VPC (which may have been set up with the help of yet another service, such as VPC service 240B of FIG. 2) may comprise a private, logically isolated network of compute instances with an associated IP address range prefix, such that the owner of the VPC may divide the IP address range into one or more private or publicly-accessible subnets, and control inbound and outbound access to or from the subnets in accordance with desired policies. VPCs may also support various other capabilities, such as bridging the VPC to external networks using encrypted Virtual Private network (VPN) connections, and/or extending existing security and management policies of the external networks to the instances of the VPCs.

In the illustrated embodiment, a relational database service 210A, managed by service manager 130X, is built using compute instances 420 of VPC 401B, such as compute instance 420K hosting implementation module 140K and compute instance 420L hosting implementation module 140L of service 210A. A client 148A has set up its own VPC 401A, comprising compute instances 420A and 420B, where for example various front-end applications of the client may be executed, such as web servers, application servers and the like. In the depicted embodiment, network connectivity between instances is implemented with the help of interface records (IRs) 470. An IR 470 may represent an example of a networking resource (to which MACPs and/or discretionary access control policies may be applied). An IR 470 may comprise an IP address and various other attributes such as a subnet identifier, security settings, and status information. The types of administrative operations supported for an IR 470 may include "create", "destroy", "attach", "detach", and "modify". A create operation may be used to generate a new IR 470 and store a persistent representation of the IR in a repository. A destroy operation may be used to delete an IR 470 from the repository. An attach operation may be used to associate an IR 470 with a compute instance 420, thereby enabling the use of the IR's IP address for network traffic to and from the instance. For example, in FIG. 4a, IR 470A with IP address 10.0.0.9 is shown as being attached to compute instance 420A. This attachment implies that network packets targeted at IP address 10.0.0.9 are delivered to compute instance 420A (using one or more physical network interface cards that happen to be resident on the hardware platform being used to implement the compute instance 420A); and that network packets sent from compute instance 420A would indicate their source IP address as being 10.0.0.9. A detach operation on an IR 470 may break the association between the IR's IP address and the compute instance 420 to which the IR was previously attached. If IR 470A were to be detached from compute instance 420A, the IP address 10.0.0.9 would no longer serve as compute instance's IP address. Modify operations on an IR 470 may include changes to the IR's IP address, security settings, and so on.

Compute instances 420A and 420B of client VPC 401A communicate with each other using respective attached IRs 470A and 470B with respective IP addresses 10.0.0.9 and 10.0.0.10 in the embodiment shown in FIG. 4a. Similarly, the instances 420K and 420L of the database service VPC 401B communicate with each other using attached IRs 470D and 470E with IP addresses 16.1.1.6 and 16.1.1.7 respectively. The IP address range prefixes for VPCs 401A and 401B are 10.0.0.x and 16.1.1.x, respectively. Communication between the VPCs 401A and 401B is enabled with the help of IR 470C, which is owned by client 148A, has an IP address 10.0.0.1 belonging to VPC 401A's address range, but is attached to compute instance 410K as shown. Thus, database related network traffic from the instances of VPC 401B can flow to the client instances in VPC 401B (via instance 420K) as a result of the attachment of IR 470C. Service manager 130X of the relational database service 210A has set up an MACP 480A on IR 470C, prohibiting the client 148A from detaching IR 470C from compute instance 420K, and thus preventing disruption of database traffic flow between the two VPCs 401A and 401B. Various other restrictions may also be implemented using MACP 480A in some embodiments—e.g., the client 148A may not be allowed to change the IP address of the IR 470C, may not be allowed to delete the IR 470C, may not be allowed to change security settings of the IR (such as the list of entities allowed to view the attachment status of the IR), and so on.

In one implementation, the following workflow may have led to the configuration of IR 470C shown in FIG. 4a. The client 148A may have sent a request to service manager 130X, requesting access to the relational database service. Service manager 130X may have sent an IR creation request to the service manager of virtual network interface service 240D on behalf of client 148A, so that the newly created IR 470C may have the client 148A designated as its owner. In some implementations, the service manager 130X may "impersonate" the client 148A in the IR creation request, e.g., an indication that the request originates at client 148A may be included in the request, even though the request was generated by service manager 130X. After the IR 470C is created, the service manager 130X, still acting on behalf of client 148A, may have attached the IR 470C to instance 420K, thus enabling inter-VPC network traffic. The service manager may then allow client 148A to use IR 470C for accessing the database service.

In the example embodiment depicted in FIG. 4b, a block storage volume (e.g., obtained from service 206B of FIG. 2) may be used to provide copies of standard data sets, such as human genome data or climate metrics collected over a specified period, as part of standard data set service 270C managed by service manager 130Z. Client 148A may have acquired ownership and access to volume 475 containing data set 476, and the client 148A may be allowed to perform computations of its choice on the data. However, service manager 130Z may wish to apply an MACP 480B to the volume 475 that contains the data set 476, indicating that the volume can only be attached to (and therefore accessible from) compute instances of a certain type (e.g., instances that use one of a specified set of virtual machine images). Such a restriction may, for example, allow the data set provider to increase the customer base for compute instances with software licensed from a particular vendor, for example, or to direct revenue associated with analysis of the data set to a particular vendor whose software is required on the restricted set of compute instances.

In the example embodiment illustrated in FIG. 4c, the service manager 130Y for an automated workload-based provisioning service 202C has set up an MACP 480C that prohibits the owner of a compute instance 422 from terminating the compute instance. The provisioning service may have launched the compute instance 422 on behalf of the client 148A (e.g., using client impersonation as described above in the context of FIG. 4a) in response to an increase in the workload directed at the client's applications. If the workload changes, the provisioning service may be configured to automatically terminate and start instances; therefore, there may be no reason for the client to terminate an instance 422, since the service is responsible for instance terminations, even though the client 148A is the designated owner of the instances and is responsible for paying for the instances. If a client 148A were allowed to terminate instance 422, and the service manager 130Y determined that the termination was not justified or required by any corresponding change in workload, the service manager 130Y may simply have to launch another compute instance to replace the terminated instance. The MACP may thus reduce the probability of erroneous or malicious instance terminations (and the consequent overhead of restarting replacement instances) in this example scenario.

MACPs may prove useful in a number of other use cases in different embodiments. In one embodiment, a service manager for a load balancing service such as service 202D may set up an MACP for managing security-related metadata associated with IRs used for the load balancers. A flexible, automatically scaling load balancer may be created at client request, and may be used to create an internet-facing entry point into a VPC or logically isolated sub-network set up on behalf of the client, so that incoming requests from the internet are balanced across a desired set of compute instances within the virtual private cloud. A client 148 that deploys the load balancer may be designated as the owner of the load balancer, and of any interface records used to enable connectivity to the load balancer from client-owned compute instances of the virtual private cloud. The client may wish to assign security settings such as "security groups" to the interface records that provide connectivity to the load balancer; such security settings may be used to control, for example, which network ports are open to a specified set or range of allowed source network addresses. The load balancing service manager may apply an MACP to the IRs, to prevent the owning client from making changes to the security settings unless a particular API is used so that the service manager is informed of the changes. In another implementation, the client may not be permitted to change security settings on an IR being used with a load balancer; instead, the client may have to send a request for any desired security changes directly to the service manager. If the client were allowed to change security group settings without notifying the service manager, it may become difficult to balance the load as intended, since some ports and/or network addresses may become unreachable.

The use of MACPs may be appropriate for most or all of the different types of services supported in a provider network 110 in various embodiments. The format [service, resource, operation] may be used herein to represent a given service type for which an operation on a resource is prohibited by an MACP; for example, for FIG. 4a, the notation [relational database service, interface record, detach] may be used. Other examples of [service, resource, operation] combinations for which MACPs may prove useful in provider networks may include [distributed computation service, compute instances, instance termination], [firewall service, subnets, subnet settings modification], [packaged website management service, interface records, IP address changes], and so on. In one embodiment, a provider network may allow clients to acquire ownership rights to compute instances that have several different third-party applications installed—e.g., a database management application D1, an anti-virus application A1, an application server AS1, and so on. Each of the different third-party application providers may be considered service managers for the provision of their respective applications, and may be allowed to specify respective MACPs to be applied to the applications. For example, even though snapshots of storage devices may be supported for the compute instance, snapshots of the storage containing the D1's data may be prohibited by an MACP, so that the client is required to use the database backup tools provided as part of the application D1 instead of using more generic snapshot capabilities.

Metadata Maintained by Access Managers

Figure 5:
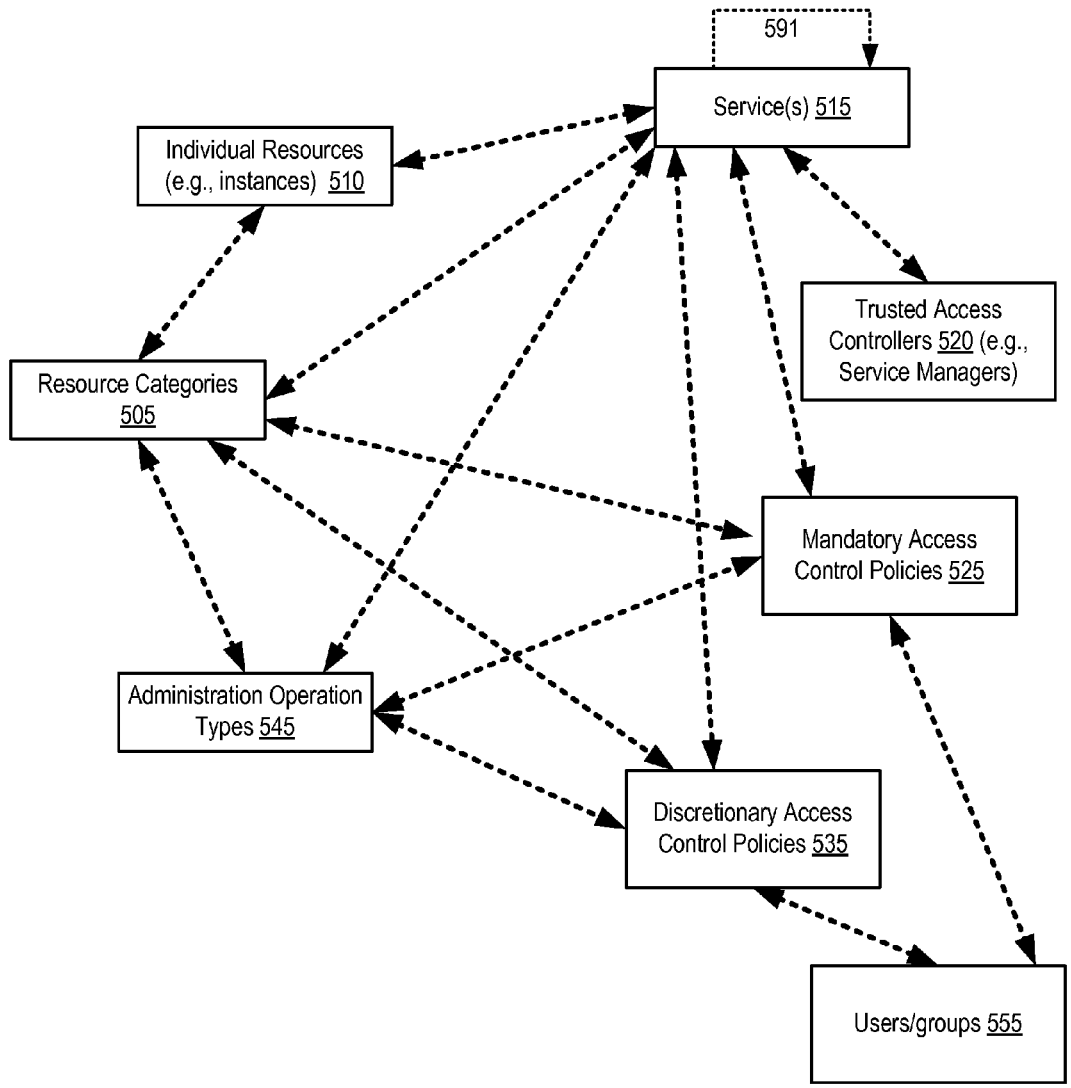
FIG. 5 illustrates a set of entities for which mapping metadata may be maintained to support access control policy implementation, according to at least one embodiment.

FIG. 5 illustrates a set of entities for which metadata mappings may be maintained to support access control policy implementation, according to at least one embodiment. The access manager 180 may maintain metadata records for the various types of entities shown, e.g., in access management database 190, and for the relationships between the entities (indicated by the dotted arrows). The metadata may include records for each of various services 515, including mappings between dependent services (as indicated by arrow 591); for example, for any given service S1, an indication that S1 depends on a different service S2, and that a third service S3 depends on S1, may be included in the metadata. For each service 515, the access manager may maintain a list of trusted access controllers 520 (e.g., service managers 130 or a set of administrators) allowed to specify MACPs for operations related to the service.

A mapping between services 515 and the categories of resources 505 used for the service may be included in the metadata. In some embodiments information about the individual resources 510 (e.g., compute instances or storage instances) being used for a given service may also be maintained. For at least some combinations of services 515 and associated resource categories 505, the access manager 180 may store information on administrative operation types 545 supported on the resources. In addition, for various resources and operations, details of the granted and prohibited permissions may be stored for various MACPs 525 and DACPs 535. In one embodiment, records of various user/group accounts 555 to which MACPs and DACPs apply may also be maintained by access manager 180. In some embodiments, a given MACP may include permissions on itself—e.g., whether various details of the MACP can be viewed by clients 148, whether MACPs can ever be modified and if so by which entities and under what circumstances, and so on.

Representations of the mappings between the different entities may be stored and indexed for efficient lookups by the access manager 180. For example, the access manager 180 may need rapid response to queries equivalent to "Is service manager S among the trusted service managers allowed to specify MACPs for operations O on resources R?" or "Which MACPs apply to operations O on resource R when R is being used for service S?" and so on. In some embodiments, an optimizer subcomponent of access manager 180 may be responsible for determining the most efficient lookup paths for a given type of metadata query.

Methods for Mandatory Access Control Policy Setup and Use

Figure 6:
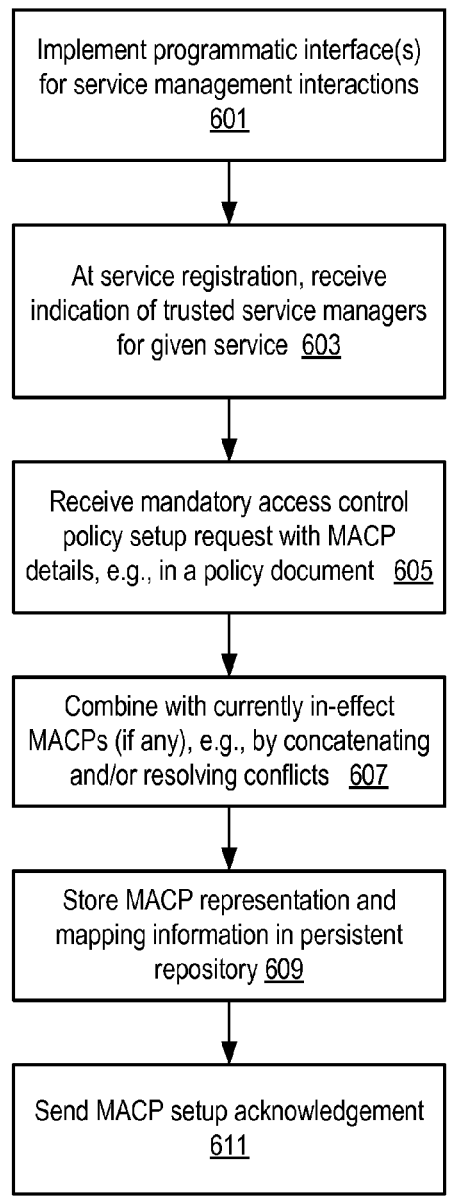
FIG. 6 is a flow diagram illustrating aspects of the operation of an access manager related to setting up mandatory access control policies in response to requests from service managers, according to at least some embodiments.

FIG. 6 is a flow diagram illustrating aspects of the operation of an access manager 180 related to setting up MACPs in response to requests from service managers 130, according to at least some embodiments. As shown in element 601, one or more programmatic interfaces may be implemented (e.g., by an interface manager component of the access manager 180, or by a standalone interface manager 182 separate from the access manager 180) for interactions between the service managers 130 and the access manager. In some embodiments, the access manager 180 may be notified of a set of trusted service managers and other access controllers permitted to specify MACPs for operations related to each given service (as indicated in element 603). An initial set of trusted access controllers for a given service may be identified in one implementation at the time that the service is initially registered or established. In some embodiments, one or more of the set of trusted service managers 130 may be permitted to add or remove entities from the set of trusted service managers.

A request to set up a particular MACP for a given combination of resource and administration operations may be received by the access manager 180 (element 605), e.g., in accordance with a programmatic interface implemented by the interface manager 182. The setup request may comprise various parameters of the MACP, such as the resources and operations covered, the immutable permissions, whether the MACP only applies to specific users or groups, and so on. In some embodiments, as noted earlier, the MACP may be detailed in a document formatted in accordance with a MACP specification standard in use in the provider network. For example, in one embodiment the MACP document may comprise a collection of <principals, actions, resources, constraints>:AuthorizationResult tuples expressed in JSON or XML, where the attempt to perform a specified action on a specified resource by a specified principal (e.g., a user) under specified constraints (e.g., when the action is attempted during a specified time window or from a specified range of IP addresses) of the tuple would result in the AuthorizationResult (e.g., denial of the attempted action, or allowance of the attempted action). For example, to prohibit detach operations on a network interface record IR-1 by client users affiliated with a client account C1, a tuple logically equivalent to <"C1: allUsers", "detach", "IR-1", "*">:"DENY" may be used (the "*" in the constraints element may indicates that no additional constraints limit the applicability of the DENY AuthorizationResult). In some implementations the entries in an MACP document may represent prohibited operations only; in other implementations both prohibited and allowed operations may be represented in the document, while in yet other implementations only allowed operations may be represented (such that the absence of an indication that an operation is allowed may serve as an indication that the operation is prohibited). In embodiments where documents formatted according to some agreed-upon specification are used for MACP definition, the access manager 180 may include a parsing engine to evaluate MACPs (e.g., to determine whether an MACP applies to a given administration request, to validate that an MACP conforms to the specification, and so on.) In response to the setup request, the access manager 180 may in some embodiments be configured to determine whether there are any other MACPs already in effect for the affected resource or operations. In such embodiments, the access manager 180 may take different actions depending on the policy combination protocol being used. According to one policy combination protocol, for example, the access manager may simply logically concatenate the multiple applicable MACPs, e.g., for a given administration request, it may apply all the applicable MACPs in a sequence, and reject the operation if any one of the MACPs prohibits it. According to another policy combination protocol, the access manager 180 may be responsible to identify conflicts between the newly received MACP and pre-existing MACPs, and attempt to resolve such conflicts by, for example, notifying the service managers responsible and requesting them to resolve the conflicts, or by choosing one of the conflicting MACPs using one or more heuristics. For example, according to one heuristic the access manager may determine that the MACP that was requested most recently should override any prior MACPs; conversely, according to another heuristic the earliest-requested MACP may override any subsequent MACPs.

After the access manager determines that the MACP should be applied as requested, a representation of the MACP and any new mappings between the MACP and various other entities such as those shown in FIG. 5 may be stored in a repository such as access management database 190 (element 609). In the illustrated embodiment, the access manager 180 may send a setup acknowledgement back to the requesting service manager 130 (element 611). In some embodiments, as noted earlier, the set of trusted access controllers allowed to specify MACPs for a given resource may include one or more clients 148. In such embodiments, either clients 148 or service managers 130 may submit the MACP setup requests via the appropriate programmatic interfaces; for example, service managers may submit setup requests using APIs directly, while clients may submit setup requests via web page form submissions.

Figure 7:
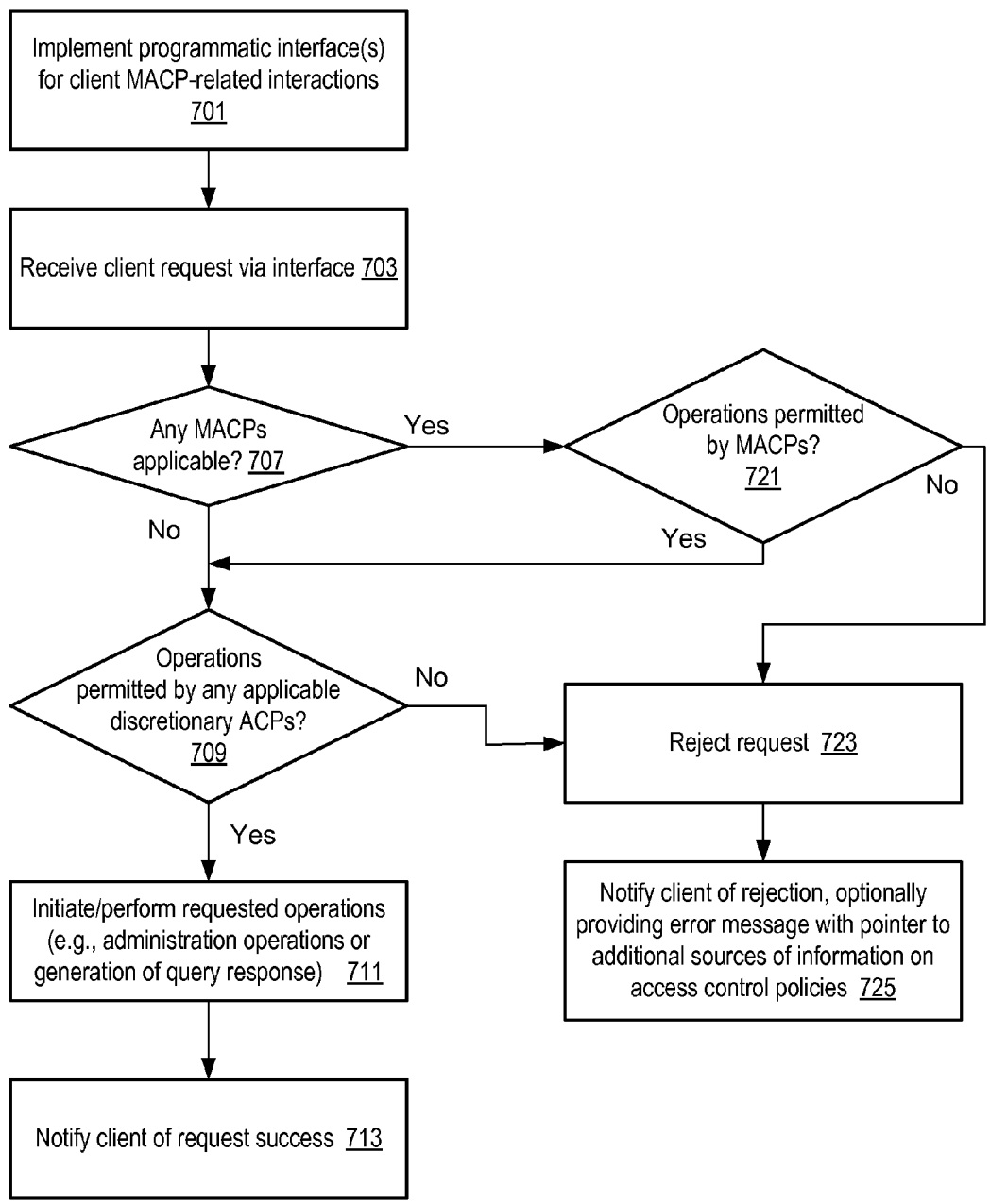
FIG. 7 is a flow diagram illustrating aspects of the operation of an access manager responsive to client requests, according to at least some embodiments.

FIG. 7 is a flow diagram illustrating aspects of the operation of an access manager 180 responsive to client requests, according to at least some embodiments. As shown in element 701, one or more programmatic interfaces may be implemented (e.g., by interface manager 182) for interactions between clients 148 and the access manager 180. For example, in one implementation a web-based client interface may be provided, while in another implementation clients may be able to choose between several different interfaces including a set of APIs, command-line tools, web pages, or other GUI interfaces. A different set of interfaces may be made available to clients than is made available to service managers 130 in some embodiments; in other embodiments, the sets of interfaces available to clients and service managers may overlap at least in part. The access manager 180 may receive an MACP-related request from a client 148 via one of the interfaces (element 703).

If the access manager determines that one or more MACPs apply to the client request (element 707), the access manager may next find out whether the operation or operations requested are permitted in accordance with the MACPs. As noted above, in some embodiments if multiple MACPs apply to the request, the access manager may have to iterate through the various applicable MACPs to determine whether the requested operations are acceptable. In some implementations, two types of prohibitions may be indicated via MACPs—"overridable" prohibitions and "non-overridable" prohibitions. As implied by the name, an overridable prohibition for an operation on a request may be overridden or overruled by a permission granted in another MACP applicable to the same resource and operation. A non-overridable prohibition may not be overruled by any other MACP. Accordingly, in one implementation where both overridable and non-overridable prohibitions are supported and multiple MACPs may apply, the access manager 180 may evaluate or examine the applicable MACPs in order until either (a) all the MACPs have been evaluated and neither an overridable prohibition nor a non-overridable prohibition has been found for the requested operation (in which case the operation is allowed) (b) a non-overridable prohibition is encountered (in which case the operation is disallowed) (c) all the MACPs have been evaluated and at least one overridable prohibition is encountered that has not been overridden by another MACP (in which case the operation is also disallowed). In another implementation, in which MACPs include allowance or acceptability indicators for requested operations, in addition to overridable and non-overridable prohibitions, the access manager 180 may only permit an operation if at least one MACP explicitly allows the operation, even if no prohibitions are found in any of the MACPs evaluated.

Figure 9:
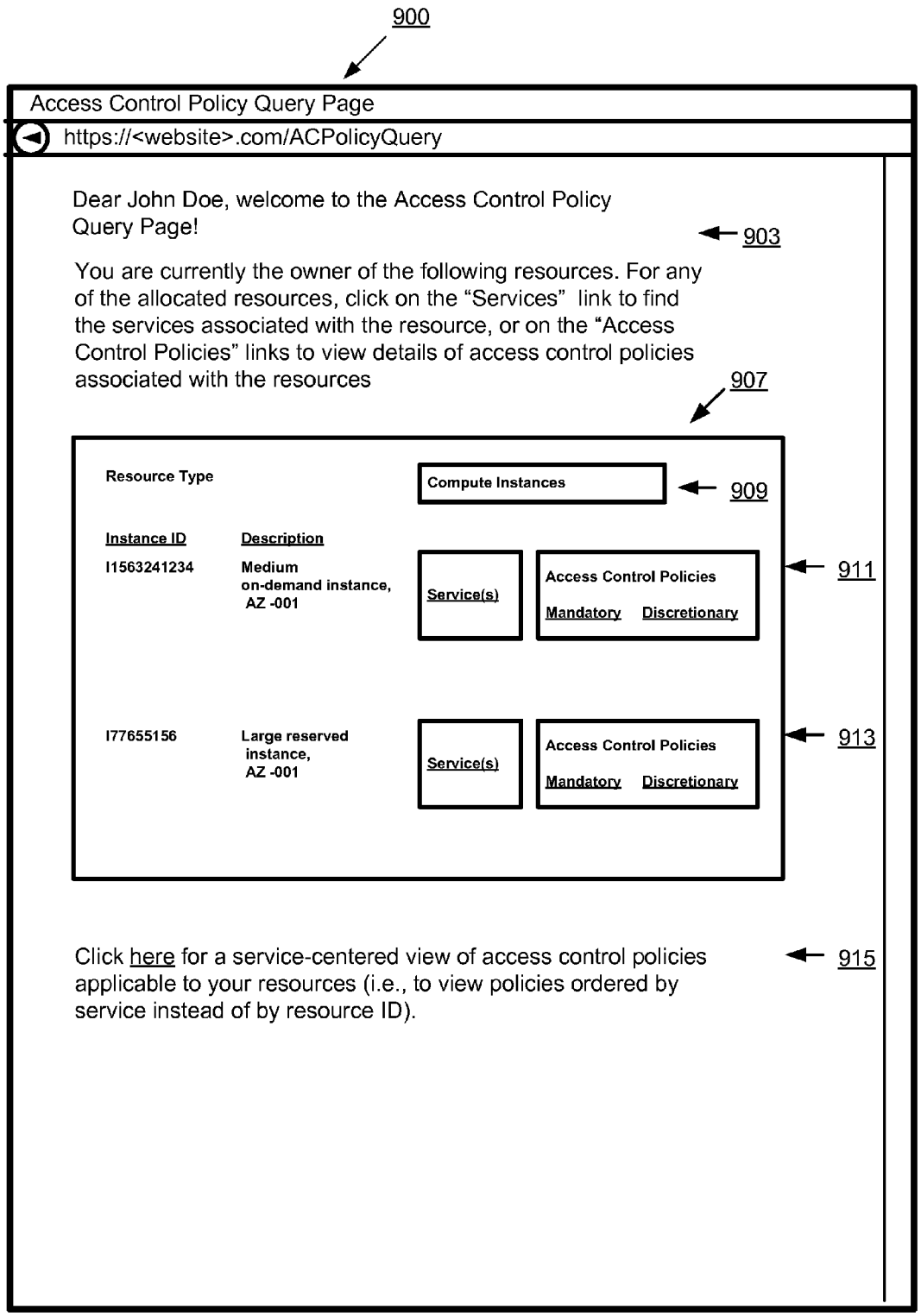
FIG. 9 illustrates a portion of an example web-based interface that may be implemented to allow clients to view mandatory access control policies applicable to resources allocated to the clients, according to some embodiments.

If the operations are permitted (as determined in element 721), the access manager may check whether any discretionary access control policies apply to the operations. In some embodiments the process of evaluating applicable MACPs may be combined with the process of evaluating applicable DACPs, and permissions granted in a DACP may overrule an overridable prohibition of an MACP. If the operations are allowed by all the applicable access control policies (mandatory or discretionary), as determined in element 709, the access manager 180 may initiate or perform the requested administrative operations (element 711), and may notify the client of the acceptance of the administration request (element 713). If either an MACP or a DACP prohibits the requested operation or operations, the administration request may be rejected in the depicted embodiment (element 723) and the client may be notified of the rejection (element 725). In some embodiments, if the request was rejected due to a DACP and the requesting client is authorized to modify the DACP to allow the requested administrative operations to proceed, the requesting client may be notified of this fact. In such a scenario, the client may then send a DACP modification request to the access manager 180 to change the necessary performance settings, and then resubmit the administration request. In one embodiment, at least for some types of rejected operations, the access manager may provide an error message to the client with a pointer to additional sources of information, e.g., information on the MACPs or DACPs that may have led to the rejection. In other embodiments, information about MACPs may not be provided to the client, and the client may simply be informed that the requested operation was rejected. In other embodiments, clients may be provided with at least some MACP descriptions or details, as illustrated in FIG. 9 below.

Figure 8A:
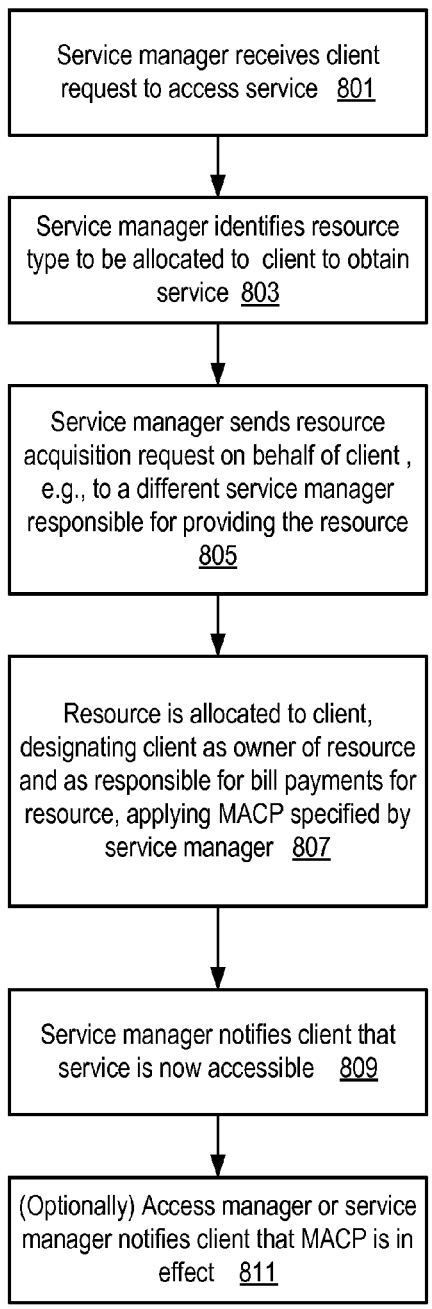
FIGS. 8a and 8b are flow diagrams illustrating respective examples of workflow sequences for resource acquisition and mandatory access control policy assignment, according to at least some embodiments.
Figure 8B:
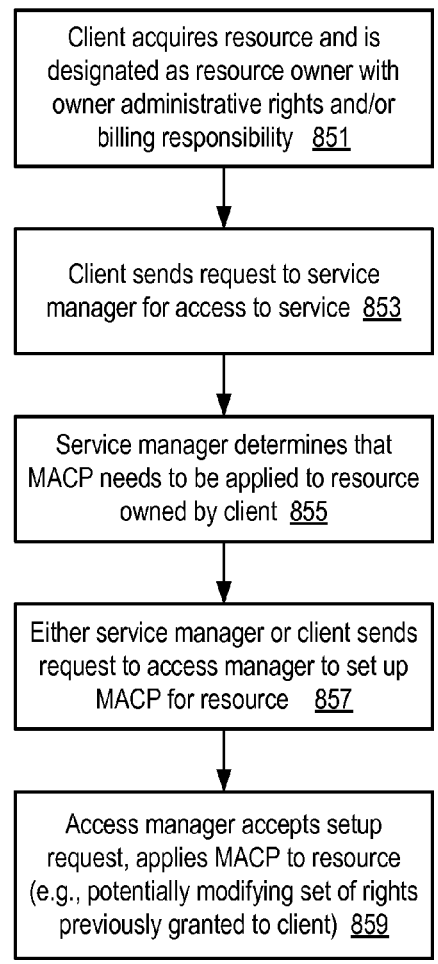

FIGS. 8a and 8b are flow diagrams illustrating respective examples of workflow sequences for resource acquisition and MACP assignment, according to at least some embodiments. FIG. 8a illustrates a scenario in which a service manager acquires a resource on behalf of a client and applies an MACP to it, while FIG. 8b illustrates a scenario in which the resource is acquired by the client on its own behalf, and the client later relinquishes some of its administrative rights when the MACP is applied.

As shown in element 801 of FIG. 8a, a service manager 130 of one of the distributed, web-accessible services being implemented in a provider network receives a request from a client 148 to obtain access to a service. For example, a client 148 may send a request to obtain access to a relational database service 202A. The service manager 130 may identify one or more resources that need to be allocated to the client 148 so that the client can use the service (element 803). Continuing the example of the database service, the database service manager may determine that the client needs an interface record (IR) 470 to access the database service, and furthermore, that the IR 470 needs to be attached to one of the compute instances where a portion of the database service is being implemented. In the depicted embodiment, the service manager may send a resource acquisition request for the needed resource (e.g., a request to create or allocate a new IR 470) on behalf of the client 148 (element 805), without the client having to send an acquisition request for the IR; in some cases, the service manager 130 may impersonate the client in the request, e.g., by indicating that the resource acquisition request was initiated by the client. The resource acquisition request may be sent to the access manager 180 in some embodiments, and to another entity such as a different service manager configured to provide the type of resource being requested in other embodiments. For example, a database service manager (e.g., for relational database service 210A of FIG. 2) may send a request for an interface record (needed for database connectivity) to a service manager of a virtual network interface service (e.g., service 240D of FIG. 2) on behalf of a client 148 that wishes to access database functionality in one embodiment. In this example, the client 148 may be designated as the owner of the interface record without having to submit an acquisition request for the interface record on its own behalf.

The requested resource (such as an IR 470) may then be allocated to the client 148 (element 807), with the client being designated as the owner of the resource, responsible for paying any billing charges incurred as a result of the allocation and use of the resource. In addition, an MACP specified by the service manager 130 may be applied to the resource (e.g., as a result of an MACP setup request from the service manager to the access manager). The client 148 may be granted a set of owner administrative rights to the resource; however, the set of operations that the client 148 may perform may be limited by the MACP. The service manager 130 may then notify the client that access to the service is available (element 809). In some implementations the client may also optionally be notified about the MACP restrictions that apply to the resource that the service manager acquired on behalf of the client (element 811).

Thus, in the embodiment depicted in FIG. 8a, the initial set of administrative rights granted to the client 148 with respect to the resource, effectively granted when the resource is initially allocated to the client, may already take the MACP into account; the client 148 may not have to explicitly relinquish any rights to use the service. As noted earlier, a resource that is acquired by a requester (such as the service manager in the scenario depicted in FIG. 8a) on behalf of the eventual owner of the resource (rather than being acquired directly the eventual owner), and for which the requester is permitted to apply access control policies, may be termed "requester-managed resources" in some embodiments. MACPs may be applied to several different types of requester-managed resources in some embodiments. The virtual compute instance 422 shown in FIG. 4c may be acquired by an automated workload-based provisioning service manager on behalf of a client, for example, and the provisioning service manager may set up the MACP 480C on compute instance 422.

In contrast, in the scenario depicted in FIG. 8b, the client 148 may acquire a resource which may eventually be used by the client to access a service. The client may be designated as the owner of the resource, with a full set of owner administrative rights and billing-related responsibilities (element 851). At some later point in time, the client may send a request to a service manager 130 to access a service (element 853). Either in the service access request or as a result of another interaction with the service manager, the service manager may be notified that a resource needed for the service is already owned by the client. However, the service manager 130 may determine that an MACP needs to be applied to the resource (element 855), before the resource can be used to access the service. Either the service manager 130, or the client 148, may then send an MACP setup request to the access manager (element 857). In implementations where the client 148 sends the MACP setup request, the client may first be added to the relevant set of trusted access controllers for the service. The access manager may then accept the setup request and apply the MACP to the resource, potentially changing the set of rights previously granted to the client 148 (element 959). The resource to which the MACP is applied in FIG. 8b may be termed an "owner-managed resource" in contrast to the "requester-managed resource" of FIG. 8a.

It is noted that the operations illustrated in FIGS. 6, 7, 8a and 8b may in some embodiments be performed in a different order than that shown, and that some of the operations may be performed in parallel in different embodiments. For example, in one embodiment multiple threads of execution may be implemented for the access manager 180, allowing several threads to respond to different client requests in parallel.

Example Web Interface for Client MACP Queries

FIG. 9 illustrates a portion of an example web-based interface that may be implemented to allow clients 148 to view MACPs applicable to resources allocated to the clients, according to some embodiments. Such an interface may be implemented by a standalone interface manager 182 in some embodiments, and by a subcomponent of the access manager 180 in other embodiments. As shown, the interface may include a web page 900 that includes a message area 903, as well as one or more resource listings 907 providing links to access control policy information.

In the depicted example web page 900, the type of resources included in resource listing 907 is indicated by element 909. In some implementations the client 148 may be able to specify the type of resource by selecting from a drop-down menu. Entries 911 and 913 are shown for respective compute instances owned by the client 148. For each instance, the instance identifier and a brief description of the instance is provided, together with a set of links. By clicking on the link labeled "Services" for a given instance, the client 148 may view the set of services being implemented using that instance. By clicking on the links labeled "Mandatory" and "Discretionary", respectively, the client may be presented with details of any MACPs or DACPs that are currently in effect for the resource, and to which the client has been granted read access. For example, if the client clicks on the "Mandatory" link, a web page or region may be displayed indicating that the client is not allowed to terminate the instance.

Example web page 900 shows a resource-centric view of access control policies, that is, the client has to follow a path from a resource listing to the applicable MACPs or DACPs. To obtain a service-centered view, in which for example MACPs are organized by service rather than by resources, the client may be provided a clickable link (labeled "here") in region 915 in the depicted embodiment. As noted earlier, in some embodiments clients may not be provided access to MACP details and/or DACP details, e.g., for security reasons.

A number of additional web pages may be implemented to support MACP-related functionality in various embodiments. For example, one or more web pages may be implemented to allow trusted clients to specify MACPs in some embodiments. In some implementations multiple programmatic interfaces may be supported for each type of operation supported—e.g., a client may also be able to use one or more APIs directly to view the kinds of information accessible via links shown in web page 900.

Illustrative Computer System

Figure 10:
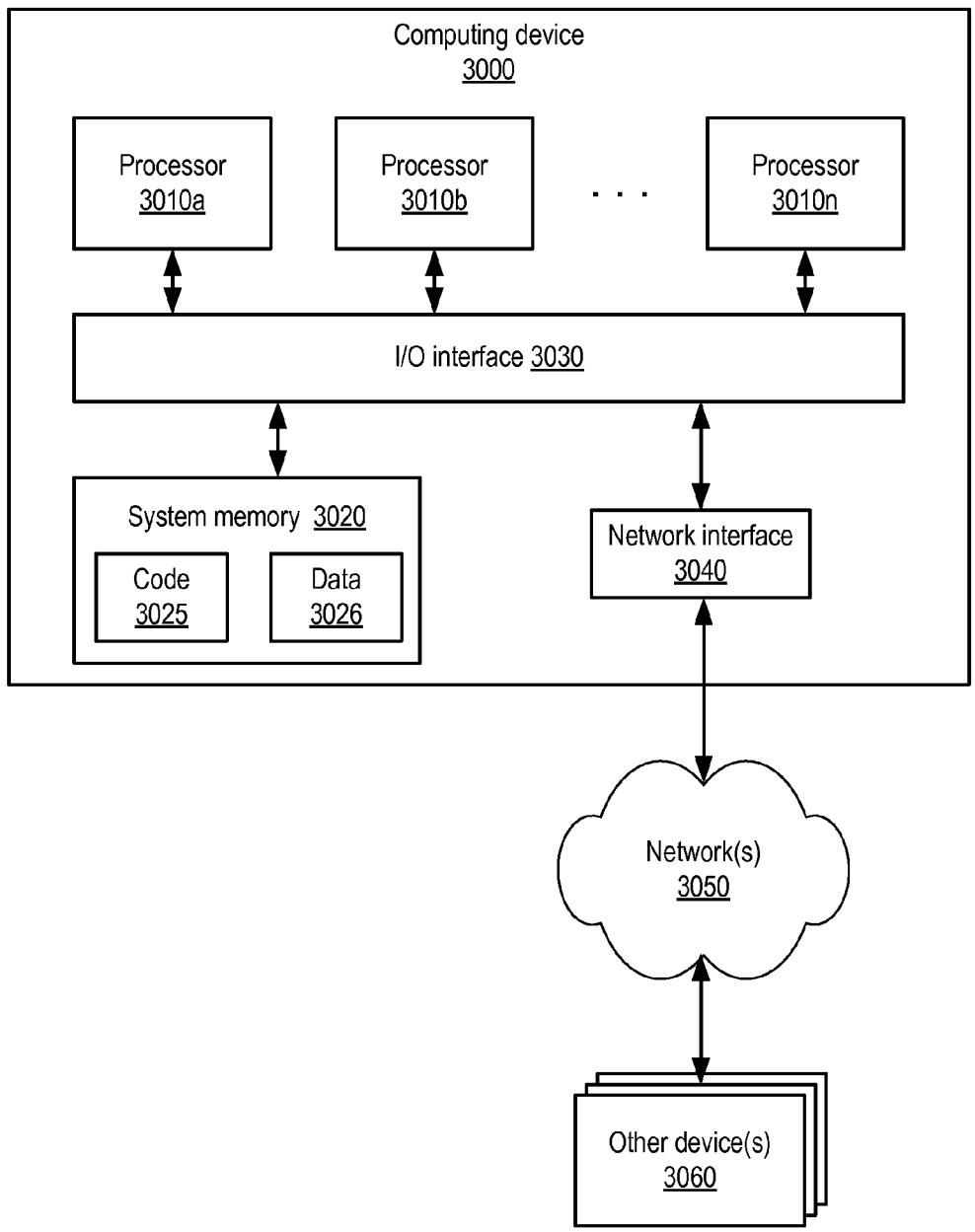
FIG. 10 is a block diagram illustrating an example computing device that may be used in some embodiments.

In at least some embodiments, a server that implements a portion or all of one or more of the technologies described herein, including the techniques to implement the functionality of access manager 180, interface manager 182 and service managers 130, may include a general-purpose computer system that includes or is configured to access one or more computer-accessible media. FIG. 10 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIGS. 1 through 9, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIGS. 1 through 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing platform", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising a plurality of computing devices configured to implement:
   a plurality of resources of a provider network configurable to provide a plurality of distributed, web-accessible services to clients of the provider network, wherein each service of the plurality of services has a respective service manager configured to coordinate provision of the service; and
   an access manager;
   wherein the access manager is operable to:
   determine whether a mandatory access control policy document specified by a service manager of a particular service of the plurality of services applies to an administration request, wherein the policy document indicates that a permission setting associated with a particular type of administrative operation on a particular resource of the plurality of resources being used to implement at least a portion of the particular service cannot be modified by a client to whom a set of owner administrative rights to the particular resource have been granted, wherein the particular resource is allocated to the client (a) without an acquisition request for the particular resource from the client and (b) as a result of an acquisition request generated by the service manager on behalf of the client; and in response to determining that the policy document applies to the administration request, and that an evaluation of the policy document indicates that an administrative operation specified in the administration request is prohibited in accordance with the policy document, reject the administration request.

2. The system as recited in claim 1, wherein the access manager is further operable to:

store, in a persistent repository, an indication of a mapping between one or more resource categories of resources usable to implement at least a portion of the particular service and one or more of (a) one or more types of administrative operations implementable on resources of the one or more resource categories; (b) one or more trusted access controllers authorized to specify mandatory access control policy documents for the one or more resource categories and the one or more types of administrative operations; or (c) one or more mandatory access control policy documents in effect for the one or more resource categories; and use the mapping to determine whether the mandatory access control policy document applies to the administration request.

3. The system as recited in claim 1, wherein at least a portion of the service manager of the particular service is operated by a business entity other than an owner of the provider network.

4. The system as recited in claim 1, further comprising one or more computing devices configured to implement an interface manager operable to:

implement a programmatic interface allowing a service manager to specify one or more mandatory access control policy documents to be associated with a corresponding resource;

wherein the mandatory access control policy document is specified in accordance with the programmatic interface.

5. The system as recited in claim 1, wherein the particular service comprises at least one of: a database management service, a load balancing service, a network security service, an automated workload-based resource provisioning service, a resource optimization service, a storage device provisioning service, or a compute device provisioning service.

6. The system as recited in claim 1, wherein the particular type of administrative operation comprises at least one of: a detachment of a network interface record to a compute instance, an attachment of a network interface record to a compute instance, a modification of a security group of a network interface record, an attachment of a storage device to a compute instance, a modification of a firewall setting, a termination of a resource instance, or a creation of a snapshot of a storage device.

7. A method, comprising:

performing by one or more computing devices:

determining whether a mandatory access control policy specified by a service manager of a particular service of a plurality of multi-tenant, web-accessible services available in a provider network applies to an administration request targeted at a resource of the provider network, wherein the policy cannot be modified by a client designated as an owner of the resource; and in response to determining that the policy applies to the administration request, and that an administrative operation indicated in the administration request is prohibited in accordance with the policy, rejecting the administration request.

8. The method as recited in claim 7, further comprising:

in response to determining that an other administrative operation indicated in an other administration request is permitted in accordance with a set of access control policies applicable to the other administration request, wherein the set of access control policies comprises the mandatory access control policy, implementing the other administrative operation.

9. The method as recited in claim 7, further comprising:

storing an indication of a mapping between one or more resource categories of resources usable to implement at least a portion of the particular service and one or more of (a) one or more types of administrative operations implementable on resources of the one or more resource categories; (b) one or more trusted access controllers authorized to specify mandatory access control policies for the one or more resource categories and the one or more types of administrative operations; or (c) one or more mandatory access control policies in effect for the one or more resource categories; and using the mapping to determine whether the mandatory access control policy applies to the administration request.

10. The method as recited in claim 7, wherein at least a portion of the service manager of the particular service is operated by a business entity other than an owner of the provider network.

11. The method as recited in claim 7, further comprising:

implementing a programmatic interface allowing a submission of a specification of one or more mandatory access control policies; and receiving a specification of the mandatory access control policy in accordance with the programmatic interface.

12. The method as recited in claim 7, wherein the particular service comprises at least one of: a database management service, a load balancing service, a resource optimization service, a network security service, an automated workload-based resource provisioning service, a storage device provisioning service, or a compute device provisioning service.

13. The method as recited in claim 7, wherein the particular type of administrative operation comprises at least one of: a detachment of a network interface record to a compute instance, an attachment of a network interface record to a compute instance, a modification of a security group of a network interface record, an attachment of a storage device to a compute instance, a modification of a firewall setting, a termination of a resource instance, or a creation of a snapshot of a storage device.

14. The method as recited in claim 7, further comprising:

implementing a programmatic interface to allow a client to view an indication of a mandatory access control policy applicable to one or more services of the plurality of multi-tenant, web-accessible services.

15. The method as recited in claim 7, further comprising:

receiving respective specifications of a plurality of mandatory access control policies to be applied to the resource; and in accordance with a policy combination protocol in effect for the resource, evaluate each policy of the plurality of mandatory access control policies to determine whether to allow another administration operation requested by a client.

16. The method as recited in claim 7, further comprising:
in accordance with a policy combination protocol in effect for an other resource of the provider network, determining whether a first mandatory access control policy specified for the other resource conflicts with a second mandatory access control policy specified for the other resource; and
in response to determining that the first mandatory access control policy conflicts with the second mandatory access control policy, transmitting a conflict resolution request to a particular service manager that specified at least one of: the first mandatory access control policy or the second mandatory access control policy.

17. The method as recited in claim 7, wherein the administration request is received from a particular client, and wherein the administrative operation is targeted at a particular resource allocated to the particular client, further comprising:
prior to receiving the administration request, receiving a resource acquisition request to allocate the particular resource to the particular client, wherein the resource acquisition request is generated by the service manager on behalf of the particular client;
in response to the resource acquisition request, allocating the particular resource to the particular client, wherein said allocating comprises assigning the particular client an authorization role of an owner of the particular resource.

18. A non-transitory computer-accessible storage medium storing program instructions that when executed on one or more processors:
determine whether a mandatory access control policy specified by a service manager of a particular service of a plurality of distributed, web-accessible services available in a provider network applies to an administration request directed at a resource of the provider network, wherein the policy cannot be modified by a client to whom a set of administrative rights to the resource have been granted;
in response to determining that the policy applies to the administration request, and that an administrative operation indicated in the administration request is prohibited in accordance with the policy, reject the administration request.

19. The storage medium as recited in claim 18, wherein the instructions when executed on the one or more processors:
store an indication of a mapping between one or more resource categories of resources usable to implement at least a portion of the particular service, and one or more of (a) one or more types of administrative operations implementable on resources of the one or more resource categories; (b) one or more trusted access controllers authorized to specify mandatory access control policies for the one or more resource categories and the one or more types of administrative operations; or (c) one or more mandatory access control policies in effect for the one or more resource categories; and
use the mapping to determine whether the mandatory access control policy applies to the administration request.

20. The storage medium as recited in claim 18, wherein at least a portion of the service manager of the particular service is operated by a business entity other than an owner of the provider network.

21. The storage medium as recited in claim 18, wherein the instructions when executed on the one or more processors:
implement a programmatic interface allowing a submission of a specification of a mandatory access control policy; and
receive a specification of the mandatory access control policy in accordance with the programmatic interface.

22. The storage medium as recited in claim 18, wherein the instructions when executed on the one or more processors:
implement a programmatic interface to allow a client to view an indication of a mandatory access control policy applicable to one or more resources of the provider network accessible by the client.

23. The storage medium as recited in claim 18, wherein the instructions when executed on the one or more processors:
receive respective specifications of a plurality of mandatory access control policies to be associated with a particular resource of the provider network; and
evaluate each policy of the plurality of mandatory access control policies to determine whether another administration operation requested by a client is to be prohibited.

24. The storage medium as recited in claim 18, wherein the administration request is received from a particular client, and wherein the administrative operation is targeted at a particular resource allocated to the particular client, wherein the instructions when executed on the one or more processors:
prior to receiving the administration request, receive a resource acquisition request to allocate the particular resource to the particular client, wherein the resource acquisition request comprises an impersonation of an identity of the particular client by the service manager;
in response to the resource acquisition request, allocate the particular resource to the particular client, wherein said allocating comprises assigning the particular client an authorization role of an owner of the particular resource.

25. The storage medium as recited in claim 18, wherein the administration request is received from a particular client, wherein the resource comprises a network interface record for which the particular client is designated as an owner in accordance with the administrative rights, wherein the network interface record is configurable to enable connectivity between a first compute resource of a first isolated sub-network of the provider network and a second compute resource of a second isolated sub-network of the provider network, wherein the particular client is designated as an owner of the first isolated sub-network, and wherein the service manager is designated as an owner of the second isolated sub-network.

26. A system, comprising a plurality of computing devices configured to implement:
a plurality of resources of a provider network; and
a service manager of a first multitenant, network-accessible service of a plurality of services implementable at least in part using a set of resources of the plurality of resources;
wherein the service manager is operable to:
receive, from a client, an access request for the particular service;
in response to the access request, submit an acquisition request for a particular resource on behalf of the client to a second service manager implementing a second service of the plurality of services, wherein the particular resource is to be used to implement at least a portion of the functionality of the first service, and wherein, as a result of the acquisition request, the client is designated as an owner of the particular resource;
specify a mandatory access control policy to prohibit one or more types of administration operations on the particular resource, wherein the mandatory access policy cannot be modified by the client; and
provide, to the client, access to the particular service implemented using the particular resource.

* * * * *